(12) United States Patent
Guo et al.

(10) Patent No.: US 7,829,059 B2
(45) Date of Patent: Nov. 9, 2010

(54) RAPID SYNTHESIS OF TERNARY, BINARY AND MULTINARY CHALCOGENIDE NANOPARTICLES

(75) Inventors: Qijie Guo, Cream Ridge, NJ (US); Rakesh Agrawal, West Lafayette, IN (US); Hugh W. Hillhouse, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 12/301,317

(22) PCT Filed: May 21, 2007

(86) PCT No.: PCT/US2007/069349

§ 371 (c)(1),
(2), (4) Date: Jul. 14, 2009

(87) PCT Pub. No.: WO2008/021604

PCT Pub. Date: Feb. 21, 2008

(65) Prior Publication Data

US 2010/0003187 A1    Jan. 7, 2010

Related U.S. Application Data

(60) Provisional application No. 60/801,963, filed on May 19, 2006.

(51) Int. Cl.
*C01B 17/00*    (2006.01)
*C01B 19/00*    (2006.01)

(52) U.S. Cl. .......................... 423/508; 423/509; 423/511; 423/561.1; 423/566.1; 977/773; 977/774

(58) Field of Classification Search ............... 423/508, 423/509, 511, 561.1, 566.1; 977/773, 774
See application file for complete search history.

(56) References Cited

U.S. PATENT DOCUMENTS

| | | | | |
|---|---|---|---|---|
| 6,126,740 | A | * | 10/2000 | Schulz et al. ............. 117/4 |
| 6,127,202 | A |   | 10/2000 | Kapur et al. |
| 2003/0106488 | A1 | * | 6/2003 | Huang et al. ............. 117/68 |
| 2005/0238568 | A1 | * | 10/2005 | Yu et al. ............. 423/508 |

FOREIGN PATENT DOCUMENTS

WO    WO 2004/108598 A1 * 12/2004

OTHER PUBLICATIONS

"Synthesis of high-quality CdS, ZnS, . . . " by Xinhua Zhong et al., J. Mater. Chem., (14) pp. 2790-2794, (2004).*

"Recent Advances in the Liquid-Phase Synthesis of Inorganic Nanoparticles" by Brian L. Cushing et al., Chem. Rev., (104), pp. 3893-3946, (2004).*

(Continued)

*Primary Examiner*—Timothy C Vanoy
(74) *Attorney, Agent, or Firm*—Bose McKinney & Evans LLP

(57) ABSTRACT

A method for synthesizing a chalcogenide nanoparticle is provided. The method comprises reacting a metal component with an elemental chalcogen precursor in the presence of an organic solvent. The chalcogenide nanoparticles include ternary, binary and/or multinary chalcogenide nanoparticles and the metal component comprises metal halides or elemental metal precursors. The alkylamine solvent has a normal boiling temperature of above about 220° C. and an average particle size of from about 5 nm to about 1000 nm.

71 Claims, 16 Drawing Sheets

OTHER PUBLICATIONS

"Generalized and Facile Synthesis of Semiconducting Metal Sulfide Nanocrystals" by Jin Joo et al., J. Am. Chem. Soc., (125), pp. 11100-11105, (2003).*

"Highly Luminescent Monodisperse CdSe and CdSe/ZnS Nanocrystals . . . " by Dmitri V. Talapin et al., Nanoletters, (vol. 1, No. 4), pp. 207-211 (2001).*

"Chemistry and photophysics of thiol-stabilized II-VI semiconductor nanocrystals" by Alexander Eychmuller et al. Pure Appl. Chem., (vol. 72, Nos. 1-2), pp. 179-188 (2000).*

International Search Report and Written Opinion dated Mar. 26, 2008.

Adurodija F. O. et al., "Growth of $CuInSe_2$ thin films by high vapour Se treatment of co-sputtered Cu-In alloy in a graphite container," Thin solid films 1999, vol. 338, n°1-2, pp. 13-19.

Artaud, M.C., et al., "$CuInSe_2$ Thin Films Grown by MOCVD: Characterization, First Devices", *Thin Solid Films*, 1998, 324, pp. 115-123.

Bhattacharya R.N., et al., "The performance of $CuIn_{1-x}Ga_xSe_2$-based photovoltaic cells prepared from low-cost precursor films," Solar Energy Materials and Solar Cells, vol. 63, No. 4, Aug. 31, 2000, pp. 367-374(8).

Bin Li, et al., "Synthesis by a solvothermal route and characterization of CuInSe2 nanowhiskers and nanoparticles," Advanced Materials, vol. 11, No. 17, 1456-1459, 1999.

C.J. Carmalt, D.E. Morrison, I.P. Parkin, "Solid-state and solution phase metathetical synthesis of copper indium chalcogenides," J. Mater. Chem. 8 (1998) 2209-2211.

Yg Chun, et al., "Synthesis of CuInGaSe2 nanoparticles by solvothennal route," Thin Solid Films, vol. 480, 46-49, 2005.

Eberspacher et al., Thin-film CIS alloy PV materials fabricated using non-vacuum, particles-based techniques, Thin Solid Films, 18-22, vol. 387, 2001.

A. Eychmuller, and Al Rogach, "Chemistry and photophysics of thiol-stablized II-VI semiconductor nanocrystals," Pure and Applied Chemistry, 72, 179-188 (2000).

Ilan Gur, Neil A. Fromer, Michael L. Geier, and A. Paul Alivisatos, (2005). "Air-Stable All-Inorganic Nanocrystal Solar Cells Processed from Solution". *Science* 310 (5745): 462-465.

Hermann et al, "Deposition of smooth Cu(In,Ga)Se2 films from Binary multilayers," Thin Solid Films, vol. 361-362, pp. 74-78, May 19, 2000.

Jiang, et al., "Elemental Solvothermal Reaction to Produce Ternary Semiconductor $CuInE_2$ (E = S, Se) Nanorods," *Inorg. Chem.*, 2000, 39 (14), pp. 2964-2965.

Jones PA, Jackson AD, Lickiss PD, et al., "Plasma-enhanced chemical vapor deposition of CuInSe2," Thin Solid Films, 1994, vol. 238, pp. 4-7.

M. Kaelin, D. Rudmann, F. Kurdesau, T. Meyer, H. Zogg, A.N. Tiwari, "CIS and CIGS layers from selenized nanoparticle precursors," Thin Solid Films, 2003, 58-62, vol. 431-432.

M. Kaelin, H. Zogg, A.N. Tiwari, O. Wilhelm, S.E. Pratsinis, T. Meyer "Electrosprayed and Selenized Cu/In Metal Particle Films", *Thin Solid Films*, 457, 391-396 (2004).

M. A. Malik et al. "A Novel Route for the Preparation of CuSe and CuInSe2 Nanoparticles" in Advanced Materials, vol. 11, No. 17, pp. 1441-1444 (1999).

CB Murray, CR Kagan and MG Bawendi, "Synthesis and Characterization of Monodisperse Nanocrystals and Close-Packed Nanocrystal Assemblies," Annual Reviews of Materials Science 2000, vol. 30, pp. 545-610.

Paredes Gutiérrez, Harold, F García, I D Mikhailov, "Two-electron quasi-one-dimensional nanoring," Revista Colombiana de Física. , v.37, p. 158-162, 2005.

Castro, et al. "Nanocrystalline chalcopyrite materials (CuInS2 and CuInSe2) via low-temperature pyrolysis of molecular single-source precursors," Chemistry of materials, 2003, vol. 15, No. 16, pp. 3142-3147.

Duchemin et al., "Growth of CuInSe2 by metallorganic chemical vapour deposition (MOCVD): new copper precursor," Journal of Materials Science: Materials in Electronics. vol. 7, No. 3, pp. 201-205. 1996.

Grisaru, et al., "Microwave-assisted polyol synthesis of $CuInTe^2$ and $CuInSe^2$ nanoparticles," Inorganic chemistry, 2003, vol. 42, pp. 7148-7155.

Ramanathan, K., et al., "Properties of 19.2% efficiency ZnO/CdS/CuInGaSe2 thin-film solar cells," Progress in Photovoltaics, 2003. 11(4): p. 225-230.

Schulz et al., "Cu-In-Ga-Se nanoparticle colloids as spray deposition precursors for Cu(In, Ga)Se2 solar cell materials," Journal of Electronic Materials 27: 433-7 1998.

Schulz, D. L.; Curtis, C. J.; Flitton, R. A.; Ginley, D. S. (1998). *Nanoparticulate Film Precursors to CIS Solar Cells: Spray Deposition of Cu-In-Se Colloids*. Gonsalves, K. E., et al., eds. Surface-Controlled Nanoscale Materials for High-Added-Value Applications: Proceedings of the Materials Research Society Symposium, Nov. 30- Dec. 3, 1997, Boston, Massachusetts. Materials Research Society Symposium Proceedings, vol. 501. Warrendale, PA: Materials Research Society pp. 375-380; NREL Report No. 27018.

* cited by examiner

RAPID SYNTHESIS OF TERNARY, BINARY AND MULTINARY CHALCOGENIDE NANOPARTICLES

RELATED APPLICATIONS

This application is a U.S. national stage application under 35 U.S.C. §371 of PCT International Application Serial No. PCT/US2007/069349, which has an international filing date of May 21, 2007, designates the United States of America, and claims the benefit of U.S. Provisional Patent Application Ser. No. 60/801,963, which was filed May 19, 2006. The disclosures of each of these prior applications are hereby incorporated by reference in their entirety.

TECHNICAL FIELD

The present invention is related generally to the rapid and economic preparation of crystalline binary, ternary and/or multinary chalcogenide nanoparticles, and particularly nanoparticles of various compositions of Cu, In, Ga, and Se.

BACKGROUND OF THE INVENTION $CuInSe_2$ and its related alloys, including $CuInS_2$, $CuGaSe_2$, $CuGaS_2$, $Cu(In_xGa_{1-x})Se_2$, $Cu(In_xGa_{1-x})S_2$, and $Cu(In_xGa_{1-x})(S_ySe_{2-y})$ where $0 \leq x \leq 1$ and $2 \leq y \leq 0$, (collectively known as CIGS), are some of the most promising candidates for photovoltaic applications due to their unique structural and electrical properties. CIGS thin film solar cells are highly stable against radiation, which makes them ideal for space applications. High efficiency solar cells have been fabricated based on CIGS absorber films grown by various techniques, with the highest reported efficiency of 19.2% reported using vacuum co-evaporation.[1] The highest quality CIGS thin films have been traditionally fabricated using vacuum co-evaporation, however, the resulting production costs of such fabrication processes are typically high, thereby limiting its usefulness in large-scale mass production applications. There are also issues associated with uniformity of the film for roll-to-roll processing. Thus, there has been a continuing effort to develop thin film deposition techniques for large area substrates using cost effective techniques.

To circumvent the limitations of vacuum co-evaporation, several techniques based on the selenization of metallic or binary precursor layers and particulate precursor films have been reported.[2-7] The selenization of pre-deposited Cu/In metal precursors on substrates by either $H_2Se$ gas or Se vapor is currently favored for commercial manufacturing processes. However, these selenization processes are complicated and timely, as well as require high operating temperatures, thereby resulting in increased processing costs and low production rates. In addition, the required use of highly toxic gases during the selenization process (such as $H_2Se$, for instance), as well as the use of high-end equipment to safely maintain the increased temperature levels, significantly adds to the fabrication costs associated with these processes. Although there are several commercialized processes based on the selenization of precursor films, the inherent drawbacks associated with these processes (e.g., high costs, composition control and material utilization issues) limit the mass utilization of the CIGS photovoltaic cells.

Other techniques, including electrodeposition,[8] chemical vapor deposition,[9-11] and spray deposition,[12,13] have also been explored for the fabrication of CIGS thin films. These techniques, however, are limited due to low material utilization, as well as low crystallinity and small crystalline sizes of the as-synthesized thin films.

Recently, nanocrystalline semiconductors have attracted a considerable amount of attention due to their unique physiochemical properties and potential applications in novel optical, electrical, and optoelectrical devices. Several groups have demonstrated the use of nanoparticle building blocks for the fabrication of nanostructured solar cells. For instance, Gur et al. demonstrated the fabrication of air stable inorganic solar cells by spin coating thin films of CdTe and CdSe nanoparticles.[14] Also, previous work on the fabrication of $CuInSe_2$ (CIS) and $Cu(InGa)Se_2$ (CIGS) thin films using amorphous Cu—In—Se and Cu—In—Ga—Se nanoparticles, respectively, has been reported by Schulz et al.[15] However, the nanoparticles employed in this study were amorphous and high temperature annealing under a selenium environment was required to achieve the desired crystalline structure. Thus, CIS and/or CIGS nanoparticles having the desired composition and crystalline structures are expected to be ideal candidates for low cost solar cells, particularly as they allow the use of low-cost coating techniques, such as spray printing, spin coating, and doctor blading. In addition, by using CIS or CIGS nanoparticles with fixed compositions and crystalline structures, the use of high temperature selenization processes under toxic $H_2Se$ gas can be minimized or even eliminated. Furthermore, the composition of the film could be easily controlled on all scales by controlling the composition of the nanoparticles. Composition uniformity allows relatively large tolerance in the thickness of the film, such that traditional coating techniques (such as spin coating, dip coating, and spray printing) can be employed to fabricate CIS or CIGS thin films. All of these advantages will significantly simplify the manufacturing process and lower the fabrication cost of photovoltaic devices.

Consequently, a simple, controlled, and tunable process for the synthesis of CIS or CIGS nanoparticles with the right composition and crystalline structure needs to be developed. Several techniques have previously been reported in the literature for the synthesis of $CuInSe_2$ and related nanoparticles. For instance, Carmalt et al. presented the solid state and solution phase metathesis synthesis of copper indium chalcogenides using metal halides and sodium chalcogenides as precursor materials.[16] For the solid-state metathesis reaction, the reaction was conducted inside a sealed ampoule and heated to 500° C. for 48 hours to produce single-phase $CuInSe_2$ particles. Although solid-state metathesis has been utilized for the synthesis of binary materials, it is difficult to use for the synthesis of ternary or multinary materials due to possible phase segregations. Thus, solid-state metathesis typically requires an extensive period of time to ensure the formation of a ternary phase. The solution phase metathesis reaction has also been presented by Carmalt et al. where the same precursors were refluxed in toluene for 72 hours. The solution phase metathesis reaction allows the use of low temperature synthesis; however, the particles produced are amorphous and require high temperature annealing at 500° C. for 24 hours in order to obtain the desired crystalline structure.

Similar solution phase metathesis reactions have also been employed by Schulz et al. in their synthesis of CIGS nanoparticles.[15] In this case, the Cu—In—Ga—Se nanoparticles were prepared by reacting a mixture of CuI, $InI_3$, and $GaI_3$ in pyridine with $Na_2Se$ in methanol at a reduced temperature and under inert conditions. The nanoparticles produced in this reaction, however, were also amorphous and high temperature annealing was required to achieve the desired crystalline material.

Another method ("hot injection method") was pioneered by Murray et al. to synthesize various metal and semiconductor nanocrystals, particularly those having diverse compositions, sizes and shapes.[17] In a typical 'hot injection' synthesis, organic ligands are used to passivate the surface of the nanoparticles to prevent particle aggregation. Moreover, nanoparticles with monodispersed sizes and shapes can be synthesized by controlling the concentration and functional group of the organic ligands.

The synthesis of $CuInSe_2$ nanoparticles using the "hot injection technique" was first presented by Malik et al. in trioctylphosphine oxide (TOPO) and trioctylphosphine (TOP) by a two step reaction.[18] In this reaction, a TOP solution of CuCl and $InCl_3$ was injected into TOPO at 100° C. and then followed by a hot injection of trioctylphosphine selenide (TOPSe) at an elevated temperature of 330° C. to initiate the nucleation and growth of nanoparticles. Spherical $CuInSe_2$ nanoparticles of about 4.5 nm were synthesized according to the authors, and the Powder X-Ray Diffraction ("PXRD") data presented indicated that binary materials such as $Cu_2Se$ and $In_2O_3$ were present as by-products.

In another study relating to the pyrolysis of molecular single source precursors, the stoichiometry precursor $(PPh_3)_2$ $CuIn(SePh)_4$ was used in the synthesis of a $CuInSe_2$ nanoparticle using spray pyrolysis.[19] While nanocrystalline $CuInSe_2$ particles ranging from about 3-30 nm were produced by the thermal decomposition of the molecular precursor, the synthesized nanocrystals typically agglomerated into large clusters. Moreover, the PXRD data indicated that CuInSe2 nanocrystals were only produced at high temperatures (e.g., from about 275° C. to about 300° C.). However, no direct images of the nanocrystals were presented. Some of the drawbacks of this process are that the preparation of the molecular precursors could be difficult and costly, as well as require low material utilization.

More recently, Grisaru et al. presented a microwave-assisted synthesis process of $CuInSe_2$ nanoparticles using CuCl and elemental In and Se as precursors in ethylene glycol based solvents.[20] While the reaction time was much faster applying microwave heating, the synthesized nanoparticles lacked defined shapes and sizes, and generally agglomerated together into large clusters. Furthermore, small amounts of $Cu_2Se$ were also detected as by-products from the reaction as shown from the PXRD data presented by the authors.

Another process, which was presented by Li et al., involved the preparation of $CuInSe_2$ nanowhiskers and nanoparticles using $CuCl_2$, $InCl_3$, and Se as reagents in ethylenediamine and diethylamine, respectively, and particularly using a solvothermal route.[21] It was suggested by the authors that amine served as a structure directing agent in the solvothermal synthesis. PXRD characterization of the nanoparticles showed a clean single phase of chalcopyrite $CuInSe_2$. Jiang et al. also explored the solvothermal synthesis of $CuInSe_2$ nanorods and nanoparticles using elemental Cu, In, and Se.[22] Chun Y G et al. further expanded the synthesis into quaternary $Cu(InGa)Se_2$ nanoparticles by solvothermal reaction of elemental Cu, In, Ga, and Se in ethylenediamine.[23] However, generally the nanoparticles synthesized using solvothermal techniques were highly polydispersed. A key feature of these solvothermal syntheses is that they are conducted in a closed autoclave and generally require from about 15 hours to a few days to perform. The reaction is also conducted at pressures much higher than atmospheric pressures and requires pressurized equipment because of the low normal boiling temperatures of the solvents used during the synthesis. For example, the normal boiling temperature for ethylenediamine and diethylamine is about 118° C. and 55° C., respectively. FIG. 1 shows that ethylenediamine and diethylamine have very high vapor pressures over the range of reaction temperatures usually used in the solvothermal synthesis. Such equipment and associated handling procedures add cost to the final product and are less amenable to very large-scale production such as is typically needed for world-scale solar panel manufacturing plants.

Although several methods have been reported on the synthesis of $CuInSe_2$ nanoparticles, none of the above-mentioned techniques are able to sufficiently control the size, shape, crystallinity and/or purity of the nanoparticles. Furthermore, many of the above-mentioned techniques typically require long reaction times. Thus, it is desirable to develop a fast and efficient process capable of producing crystalline CIS or CIGS nanoparticles without resulting impurities or by-products. As such, the present teachings are intended to overcome and improve upon these and/or other shortcomings currently found within the prior art.

SUMMARY OF THE INVENTION

The present invention is related generally to the rapid and economic preparation of crystalline ternary or multinary chalcogenide nanoparticles of various compositions of Cu, In, Ga, and Se.

According to one aspect of the present invention, a fast and efficient process for synthesizing binary, ternary and/or multinary nanoparticles using commonly available precursors at moderate temperatures and at atmospheric or near atmospheric pressures is provided. According to this aspect of the present invention, the binary, ternary and/or multinary nanoparticles may be selected from various combinations of Cu, In, Ga, Se, and S, and the precursors may include various metal halides, elemental metals, elemental chalcogen, as well as chalcogen compounds.

According to another aspect of the present invention, the synthesis of the presently disclosed chalcogenide nanoparticles is accomplished by using the above-mentioned precursors in alkylamines, particularly those having normal boiling temperatures greater than 220° C., or alkyl chain lengths greater than or equal to about 12 carbons. In certain embodiments, there can be more than one alkyl chain attached to the amine group. In such cases, the total carbon atoms on all the alkyl chains are equal to or greater than about 12. The normal boiling temperature ($T_b$) is defined as the temperature at which an alkylamine has a vapor pressure of one atmosphere absolute. Moreover, the alkyl tail of the amine may be saturated, unsaturated, branched, or any combination thereof.

According to another aspect of the present invention, a process capable of fabricating CIS and CIGS nanoparticles with a controlled stoichiometry and crystalline structure for photovoltaic or other non-solar cell applications is provided. According to this aspect of the present invention, the relative atomic proportion of Cu, In, and Se may not be strictly 1:1:2. Moreover, the photovoltaic activity may be obtained when the structure is slightly deficient in Cu. Preparation of such particles for proper photovoltaic activity is within the scope of the present teachings. Alternatively, novel photovoltaic cells may be prepared by using particles that are slightly rich in Cu. Synthesis of such particles is also within the scope of the present invention.

In yet another aspect of the present invention, a tunable process capable of synthesizing CIS and CIGS nanoparticles with various shapes including nanoparticles, nanodisks, and nanorings having a size of about 5 nm to about 1000 nm is provided. The synthesis of smaller or greater size particles is also within the scope of the present teachings.

In still another exemplary embodiment herein, the preparation of crystalline metal chalcogenide nanoparticles is provided. According to this embodiment, the metal chalcogenides may include various combinations of Cu, In, Ga, and Se, such as $CuInSe_2$, $CuGaSe_2$ and $Cu(In_xGa_{1-x})Se_2$ for example. The composition of the chalcogenide nanoparticles could be stoichiometric, excessive or deficient in copper. Moreover, the composition of the nanoparticles is not limited to the above-mentioned elements, and the process described in this description could be adapted for the synthesis of other chalcogenide nanoparticles of tellurium or sulfur with various suitable metals.

In an alternate embodiment, a method for making crystalline metal chalcogenide nanoparticles is provided. According to this method, the metal and chalcogenide precursor solutions are prepared in organic solvents and alkylphosphine and the subsequent solution phase of the precursor is reacted to form the metal chalcogenide nanoparticles. The solution phase of the reaction comprises organic solvents including saturated, non-saturated or branched alkylamines, and particularly alkylamines having a high boiling temperature ($T_b > 220°$ C.) or a chain length of 12 carbons or greater. For instance, exemplary precursors include various metal halides, elemental metals and/or elemental chalcogens. Typically, the reaction is performed relatively quickly, whereby considerable amounts of nanoparticles are formed within minutes after the constituting precursors are added. To separate the nanoparticles from the reaction mixture, solvent and/or anti-solvent may be added to the reaction mixture, and then the mixture centrifuged to collect the solid precipitate of the nanoparticles. Thereafter, the supernatant can be decanted and the precipitate re-dispersed in a non-polar solvent (e.g., hexane and toluene) to form a stable nanoparticle suspension.

In further exemplary embodiments herein, the chalcogenide nanoparticles of the present invention may comprise elemental constituents substitutable with an elemental metal or a combination thereof. According to this exemplary embodiment, the elemental metals substitutable with the elemental constituents include Ag, Zn, and Cd.

According to another exemplary embodiment, a method for synthesizing a chalcogenide nanoparticle is provided. The method comprises reacting a metal component with a chalcogen precursor in the presence of an organic solvent having at least one of a boiling temperature equal to 220° C. or above and a chain length of about 12 carbon atoms or above.

In yet another exemplary embodiment, a method for synthesizing crystalline metal chalcogenide nanoparticles is provided. According to this exemplary embodiment, the method comprises preparing a reaction mixture by combining a metal precursor solution with a chalcogen precursor solution in the presence of an organic solvent, the organic solvent having at least one of a boiling temperature 220° C. or above and a chain length of at least 12 carbon atoms; separating nanoparticles from the reaction mixture by adding at least one of a solvent and an anti-solvent to the mixture; collecting a solid precipitate of the nanoparticles from the mixture; and re-dispersing the precipitate in a non-polar solvent to form a stable nanoparticle suspension.

In still another exemplary embodiment, a method for synthesizing crystalline metal chalcogenide nanoparticles is provided in which a metal component is reacted with a chalcogen precursor in the presence of an alkylamine solvent selected from the group consisting of dodecylamines, tetradecylamines, hexadecylamines, octadecylamines, oleylamines and trioctylamines. According to this embodiment, the chalcogenide nanoparticles comprise at least one of ternary, multinary, and binary chalcogenide nanoparticles, the ternary, multinary and binary chalcogenide nanoparticles each being formed of a combination of components selected from the group consisting of Cu, In, Ga and Se.

In yet another exemplary embodiment, a method for synthesizing a chalcogenide nanoparticle is provided. The method comprises reacting a metal component with a chalcogen precursor in the presence of an organic solvent near atmospheric pressure and for a period of from about 5 minutes to about 60 minutes.

The above-mentioned aspects of the present teachings and the manner of obtaining them will become more apparent and the teachings will be better understood by reference to the following description of the embodiments taken in conjunction with the accompanying drawings, wherein:

DETAILED DESCRIPTION

Figure 1:
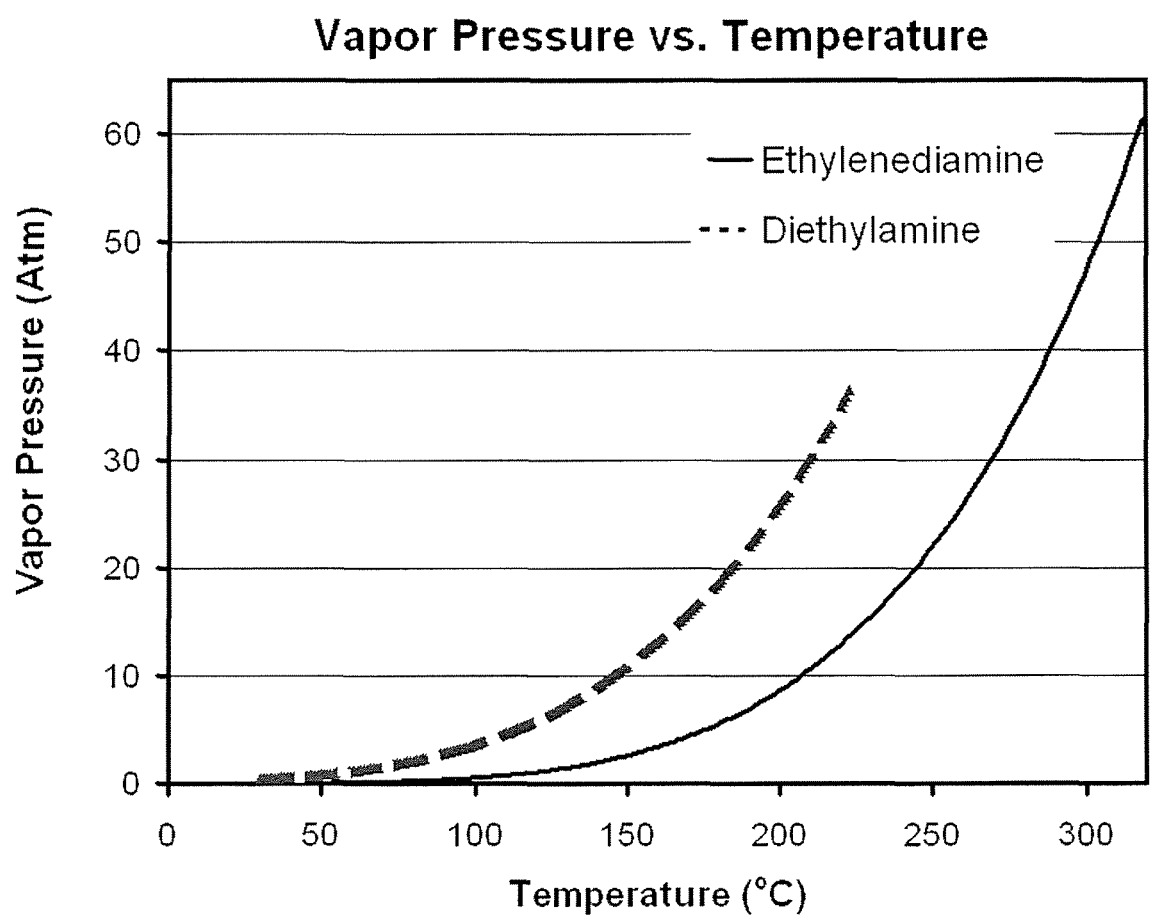
FIG. 1 depicts vapor pressures versus temperature curves for ethylenediamine and diethylamine.

The embodiments of the present teachings described below are not intended to be exhaustive or to limit the teachings to the precise forms disclosed in the following detailed description. Rather, the embodiments are chosen and described so that others skilled in the art may appreciate and understand the principles and practices of the present teachings.

The present invention details steps for the synthesis of high-quality crystalline metal chalcogenide nanoparticles including Cu, In, Ga, and Se. The synthesis involves reacting metal precursors with chalcogen precursors in organic solvents to form the corresponding chalcogenide nanoparticles. Exemplary metal precursors include, for instance, elemental metals or metal halides. In an exemplary embodiment, the illustrative precursors are metal chlorides such as CuCl, $InCl_3$ and $GaCl_3$. Other exemplary examples of metal halides include iodides, bromides, etc. Moreover, the chalcogen precursors may be elemental or compounds of elements, such as those found within group 16 of the periodic table, for instance S, Se, and Te. The process that is the focus of this exemplary embodiment has a number of advantages over other reported synthesis processes that use similar materials. For instance, unlike many traditional processes, the present processes have a fast reaction time, are able to synthesize at moderate temperatures and/or near atmospheric pressure, use commonly available precursor materials, as well as are able to synthesize ternary and multinary crystalline chalcogenide nanoparticles.

The disclosed methods are primarily focused on describing the synthesis of $CuInSe_2$ and $CuGaSe_2$ nanoparticles. It should be understood, however, that for those skilled in the art, the same process may also be applied to the synthesis of any combination of nanoparticles such as, for example, $Cu(In_{1-x}Ga_x)Se_2$, $Cu_{1-x}InSe_2$, $Cu_{1-y}(In_{1-x}Ga_x)Se_2$, as well as the synthesis of various binary or multinary chalcogenides, such as Cu, In, or Ga with Se. Exemplary binary compounds in accordance with the present teachings include, but are not limited to, CuSe, $Cu_{2-x}Se$, GaSe, $Ga_2Se_3$, InSe, $In_2Se_3$, $CuSe_2$, $GaSe_2$ and $InSe_2$. It also should be understood that the present invention can be practiced using any suitable combination of metal or various combinations of metals. Moreover, it should also be understood and appreciated herein that any disclosed ratios may be substituted for the Cu, In, and Ga components, as well as the S and Te components may be substituted for the Se components. In further exemplary embodiments disclosed herein, the chalcogenide nanoparticles may comprise elemental constituents substitutable with an elemental metal or a combination thereof. According to this exemplary embodiment, the elemental metals substitutable with the elemental constituents include Ag, Zn, and Cd. For convenience, elements discussed in the embodiments of the present teachings are typically represented with their commonly accepted chemical symbols, including copper (Cu), indium (In), gallium (Ga), selenium (Se), silver (Ag), zinc (Zn) and cadmium (Cd).

Suitable organic solvents useful in accordance with the present teachings include any alkylamine having a normal boiling temperature greater or equal to about 220° C. and/or having a carbon chain length of about 12 or above. The alkyl tail of the amine may be saturated, unsaturated or branched. Besides monoalkylamines, dialkyl and trialkylamines may be used. In such cases, the total number of carbon atoms in the alkylamine molecule (including all the alkyl chains) is greater than or equal to about 12. The purpose of the alkylamine is to provide a medium for the reaction and to assist in minimizing or preventing agglomeration of the nanoparticles. Without wishing to be tied to theory, it is believed that the alkylamine provides a coordinating media that covers the surface of nanoparticles and keeps them from agglomerating. However, this expectation should not be construed as limiting this description. Some specific examples of suitable organic solvents include dodecylamine, tetradecylamine, hexadecylamine, octadecylamine, oleylamine, and trioctylamine.

Figure 2:
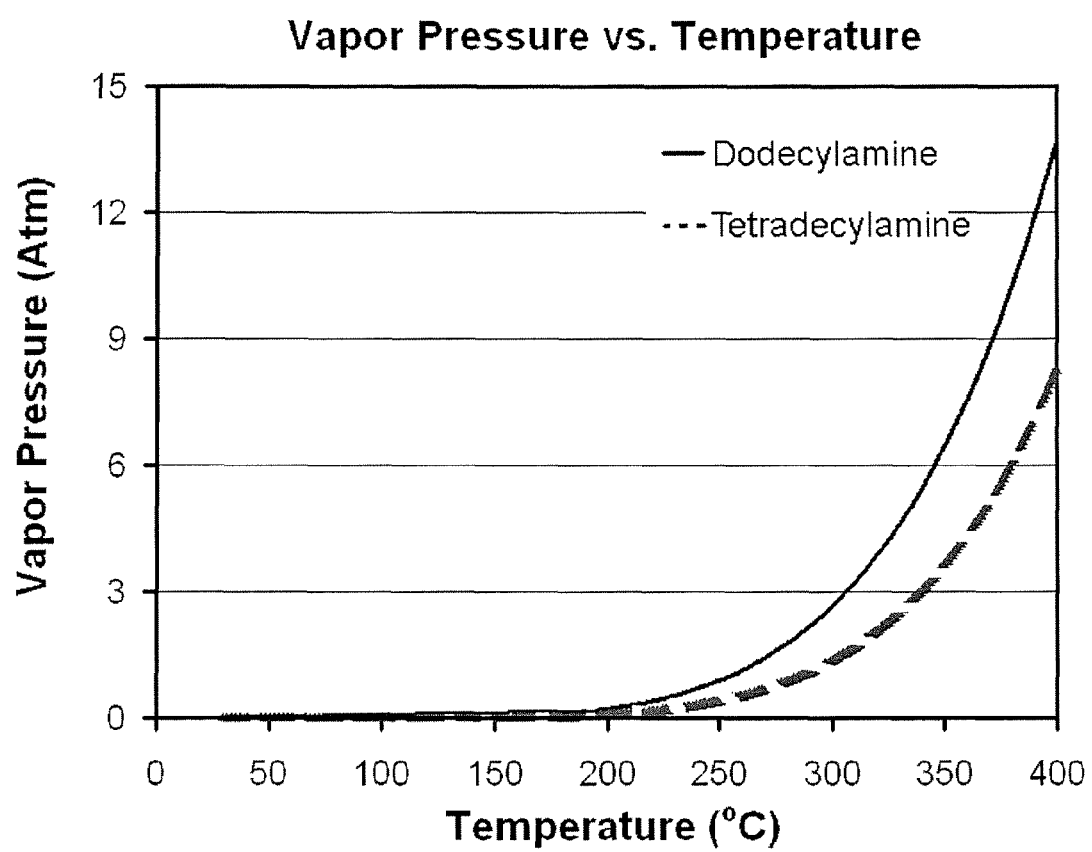
FIG. 2 depicts vapor pressures versus temperature curves for dodecylamine and tetradecylamine.

FIG. 2 depicts vapor pressure curves for dodecylamine and tetradecylamine. As can be seen from FIG. 2, the exhibited vapor pressures of dodecylamine and tetradecylamine are much lower than those exhibited for ethylenediamine and diethylamine (see FIG. 1). While the vapor pressures of dodecylamine and tetradecylamine are lower than those exhibited for ethylenediamine and diethylamine, the vapor pressures of the even longer chain alkylamines are expected to be even lower. More particularly, the use of such long chain alkylamines allows the reaction to be conducted at near atmospheric pressures and at temperatures greater than or equal to about 220° C. At higher reaction temperatures, a judicious choice of alkylamine will keep the reaction pressure close to atmospheric pressure, which is desirable in certain specific embodiments. However, in other specific embodiments, the reaction may be run at a pressure slightly higher than atmospheric pressure. In any event, it has been determined that having the reaction pressure within a few psi of atmospheric pressure is an optimal operating condition in accordance with the present teachings. It should be understood, however, that the reaction pressure may be as high as six (6) atmospheres absolute in certain embodiments.

Preventing oxygen from being present in the reaction medium during the synthesis of the chalcogenide nanoparticles, particularly due to the possible formation of metal oxides, is an aspect that should also be considered upon performing the processes of the present teachings. More particularly, if metal oxides are formed, efforts should be made to avoid introducing oxygen into the system, including even incidental amounts of oxygen within the system. As will be understood and appreciated by those of ordinary skill in the art, special techniques and equipment are available to achieve an oxygen-free atmosphere. As such, the precursor can be prepared in a solution in an oxygen-free atmosphere or inside a glove box, for instance, by using a Schlenk line or vacuum line connected to a condenser and round bottom flask. If the introduction of oxygen into the system is unavoidable, however, for example during the addition of solvents or precursor solution to the reaction flask, it may be necessary to degas and/or purge the system with inert gas (e.g., $N_2$, Ar, or He) to remove the oxygen before proceeding to further steps. Such techniques (as briefly described above) are well known and within the skill of the ordinary artisan. Although it may be useful to conduct the present reactions under oxygen-free atmospheric conditions, such an oxygen-free environment is not required herein and should not be viewed as limiting the scope of the present teachings.

Figure 3:
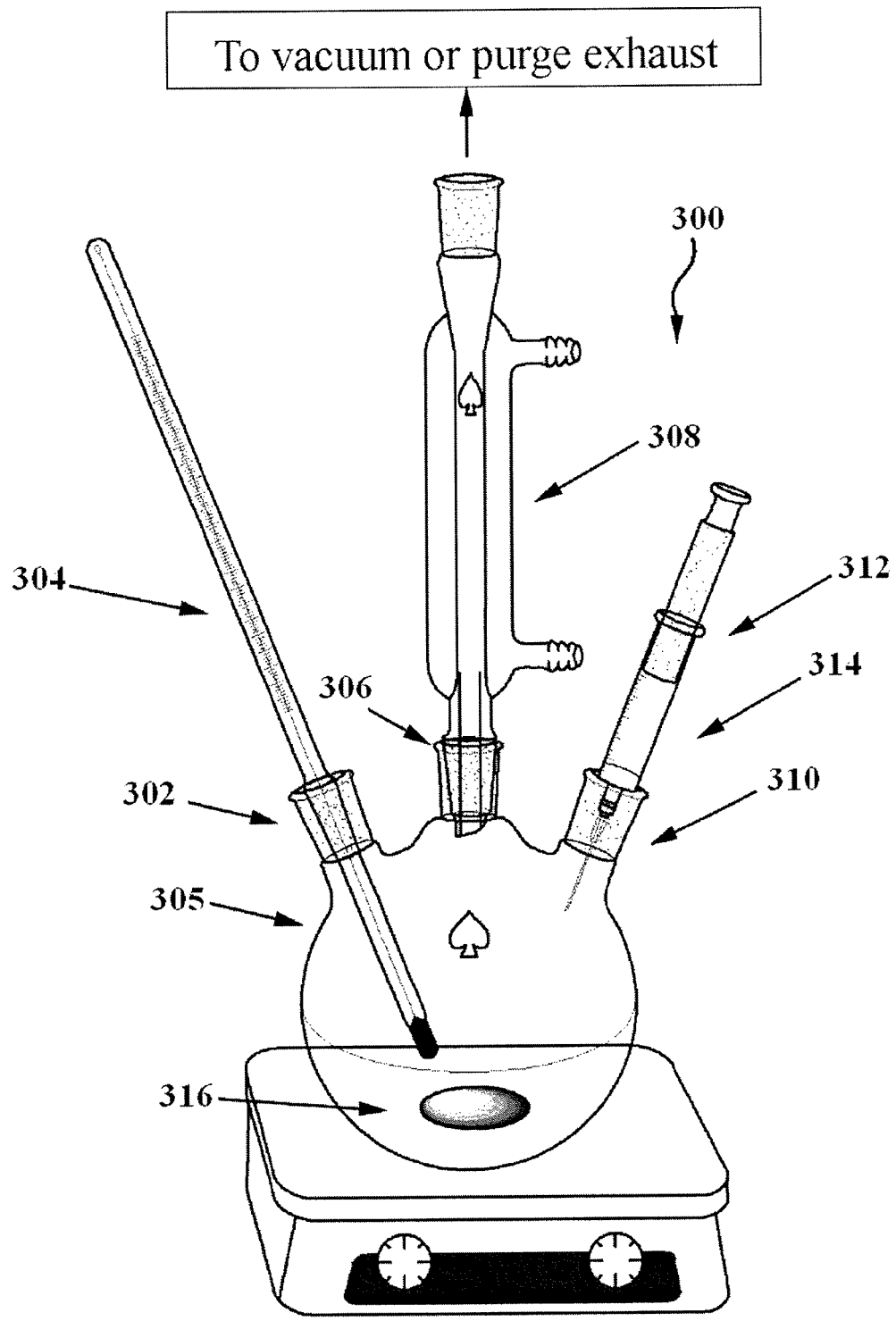
FIG. 3 depicts a schematic drawing of an experimental setup in accordance with the present invention.

FIG. 3 depicts a schematic of an exemplary experimental apparatus 300 useful in accordance with the present teachings. According to this exemplary embodiment, a round-bottom flask 305 having three necks is used. One of the necks 302 is connected to a thermometer or thermocouple 304, which is used to monitor the temperature of the reaction within the reaction flask 305, while a second neck 306 is connected to a condenser 308. The condenser 308 is further connected to a Schlenk line (not shown), i.e., a vacuum gas manifold, which connects to a vacuum pump and an inert gas supply. This arrangement allows the connected apparatus to be purged with inert gas by switching between vacuum and inert gas flows. The purging is done by switching the system to a vacuum mode for about 5-15 minutes to remove the gas inside the flask 305 and then switching back to an inert gas flow to backfill the flask. The inert gas backfills the flask 305 because the pressure inside of the flask is lower from the vacuuming process. A third neck 310 is usually sealed with a rubber stopper and serves as an injection port 312 for the addition of precursors and solvents using a syringe 314. A heating mantle or oil/sand bath can be used to heat the flask. A magnetic stirrer 316 is usually placed inside the flask 305 to keep the reaction mixture well mixed.

The crystalline chalcogenide nanoparticles of the present teachings are formed by preparing corresponding metal and chalcogen precursor solutions in an alkylamine or alkylphosphine solvent. The metal precursor solution is then added to a fixed amount of alkylamine solvent, which is typically about 1-5 times greater than that of the metal precursor. The metal precursor is degassed and purged with inert gas at a suitable temperature, typically ranging from about room temperature (e.g., about 20° C. to about 25° C. or about 68° F. to about 77° F.) to an elevated temperature. Suitable elevated temperatures in which the alkylamine solvent is degassed and purged with inert gas in accordance with the present teachings include any suitable temperature higher than the room temperature, and is generally higher than about 100° C. or at the boiling temperature of the solvent under the vacuum condition of degassing.

After the addition of the metal precursor solutions, the system is then purged with an inert gas typically about three to five times to remove any incidental oxygen that may have been introduced during the addition of the precursors. Next, a stoichiometric or near stoichiometric amount of chalcogen precursors may be added to the solution, and then its temperature increased to about 220° C. or above to form the corresponding chalcogenide nanoparticle. Alternatively, the chalcogen precursors may be added at the final reaction temperature of 220° C. or above, to form the corresponding metal chalcogenide nanoparticles. In the case of CIS, the color of the solution turns dark immediately after the injection of the selenium precursor, which indicates the formation of nanoparticles. If the temperature is sufficiently high, the reaction is typically completed in less than an hour and usually within five minutes after the injection of the selenium precursor. After the reaction, the solution is cooled down to room temperature by either removing the heating element or quenching the solution by adding a room temperature solvent (alkylamine). Next, an amount of a solvent (e.g., hexane or toluene) and a miscible anti-solvent (e.g., ethanol or methanol) is added to the reaction mixture and the nanoparticles may be collected by centrifuging. The amount of solvent and anti-solvent added is usually near the volume of the synthesized reaction mixture. After centrifuging, the particles may be obtained by decanting the supernatant.

In one embodiment of the present invention, the shape of the chalcogenide nanoparticles can be controlled by varying the solvents used in the synthesis method. For the synthesis of near-isotropic chalcogenide nanoparticles, metal and chalcogen precursors are dissolved in alkylamine and reacted without the addition of any other solvents or capping agents at a temperature of about 220° C. or above to produce the corresponding chalcogenide nanoparticles. During the preparation of the metal halide precursor solution, the temperature may be increased to about 100° C. to enhance the solubility of the metal halides. To synthesize disk-shaped chalcogenide nanoparticles, the metal and chalcogen precursors are dissolved in trioctylphosphine (TOP), and are reacted in octadecylamine at a temperature about 220° C. or above. To synthesize ring-shaped chalcogenide nanoparticles, the metal and chalcogen precursors are dissolved in trioctylphosphine (TOP), and are reacted in oleylamine at a temperature about 220° C. or above.

It is possible to synthesize the ring and disk shaped nanoparticles by reacting chalcogen precursors dissolved in TOP with metal precursors dissolved in alkylamines. It is also possible to direct the shape of the nanoparticles by independently adding TOP into a reaction. It should be understood that the above-mentioned methods for preparing the precursor solutions are illustrative only and should not be construed as limiting the scope of the present invention, particularly as numerous modifications and changes can be readily made by those skilled within the art. For example, the metal or chalcogen precursors may be dissolved in alkylamines that are different from the alkylamine in which the reaction is conducted. An example may be the use of alkylamines having low boiling temperatures for dissolving the precursor. Moreover, it should also be understood and appreciated herein that the order for adding the constituting metal and chalcogen precursors, as well as the associated temperature needed to conduct the reaction, can be varied in the synthesis method without straying from the scope of the present teachings. For example, the order of adding the constituting precursors may be altered and/or all of the constituting precursors may be added at once at a desirable temperature. In addition, all or part of the constituting precursors may be added at low temperatures, such as for instance between about 110° C. and about 220° C., or at a final reaction temperature, generally above about 220° C.

An advantage of the presently disclosed methods is the improved quality of the as-synthesized chalcogenide nanoparticles. As mentioned above, the nanoparticles synthesized by other reported techniques generally have small particles, large clusters of agglomerated nanoparticles, lack crystalline structures, impurities or by-products and/or require high pressures. However, the chalcogenide nanoparticles prepared as described in this disclosure include crystalline particles having desirable compositions. Furthermore, the nanoparticles form stable dispersions within the non-polar solvents.

Another advantage of the presently disclosed methods is the simplicity of the synthesis process. More particularly, the disclosed reaction is very fast, such that the crystalline chalcogenide nanoparticles are formed within a few minutes after the constituting precursors are added. In addition, the synthesis of the multinary chalcogenide nanoparticles is performed at a moderate temperature near atmospheric pressure. Furthermore, the precursors used for the synthesis of the chalcogenide nanoparticles are commonly available. As such, various metal halides or elemental precursors can be used for the present teachings. Lastly, the equipment needed for the synthesis methods is commonly available—i.e., special equipment is not needed to achieve high temperatures and pressures.

Advantages and improvements of the methods of the present invention are demonstrated in the following examples. These examples are illustrative only and are not intended to limit or preclude other embodiments of the present invention.

The following examples demonstrate the practice and utility of the present invention but are not to be construed as limiting its scope. Any suitable laboratory equipment known to those skilled in the art can be utilized to synthesize the nanoparticles and analyze its properties thereof. In the following examples, transmission electron microscopy (TEM) was performed using a JEOL JEM 2000 FX; field emission scanning electron microscopy (FE-SEM) was performed using a Hitachi S4800; powder X-ray diffraction (PXRD) was performed using a Scintag X2 Diffraction System; inductively coupled plasma mass spectroscopy (ICPMS) was performed using a Thermo Jarrell Ash AtomScan 16, and energy dispersive X-ray spectroscopy (EDX) was performed using an Oxford Inca 250 EDS system built on a FEI Nova NanoSEM.

Example 1

$CuInSe_2$ nanoparticles were synthesized using oleylamine as the only solvent. It is believed that the amines may act as surfactants or stabilizers during the synthesis of the nanoparticles even though the present invention is not bound by this conjecture. $CuInSe_2$ nanoparticles were synthesized by reacting CuCl, $InCl_3$, and Se in oleylamine at an elevated temperature of about 220° C. under an inert atmosphere. All manipulations were performed using standard air-free techniques utilizing a Schlenk line or glove box. According to the principles of this experimental procedure, 6 ml of oleylamine, 2.5 ml of 0.2 molar solution of CuCl in oleylamine, and 2.5 ml of 0.2 molar solution of $InCl_3$ in oleylamine were added to a 25 ml three-neck round bottom flask connected to a Schlenk line apparatus as shown in FIG. 3. During the preparation of the CuCl precursor solution, the temperature was increased to about 100° C. to enhance the solubility of CuCl. The contents in the flask were heated to 130° C. and purged with argon three times by repeated cycles of vacuuming and back-filling with inert gas, and then degassed at 130° C. for 30 minutes. Next, the temperature of the reaction mixture was raised to 285° C., and 1 ml of 1 molar Se powder in oleylamine was rapidly injected into the reaction mixture. After injection, the temperature was dropped to approximately 280° C., and the color of the solution started to turn dark. The temperature was held at 280° C. for 30 minutes until the reaction was completed. After the reaction, the mixture was allowed to cool to 60° C. and the non-polar solvent hexane was added to disperse the particles. The miscible anti-solvent ethanol was then added to flocculate the particles. The particles were then collected by centrifuging at 10000 RPM for 10 minutes. The dark precipitate was then redispersed in a non-polar solvent to form a stable dispersion.

The $CuInSe_2$ nanoparticles were characterized using a number of techniques. For instance, the size and morphology of the as-synthesized $CuInSe_2$ nanoparticles were characterized using FE-SEM and TEM. The crystalline structure of the $CuInSe_2$ nanoparticles were determined using PXRD, while the composition of the nanoparticles were determined using EDX. For characterization purposes, the nanoparticulate suspension was washed using a hexane and ethanol mixture (1:1 ratio) and centrifuged to remove any residual solvent. The precipitate was then redispersed in toluene and drop-cast on appropriate substrates.

Figure 4:
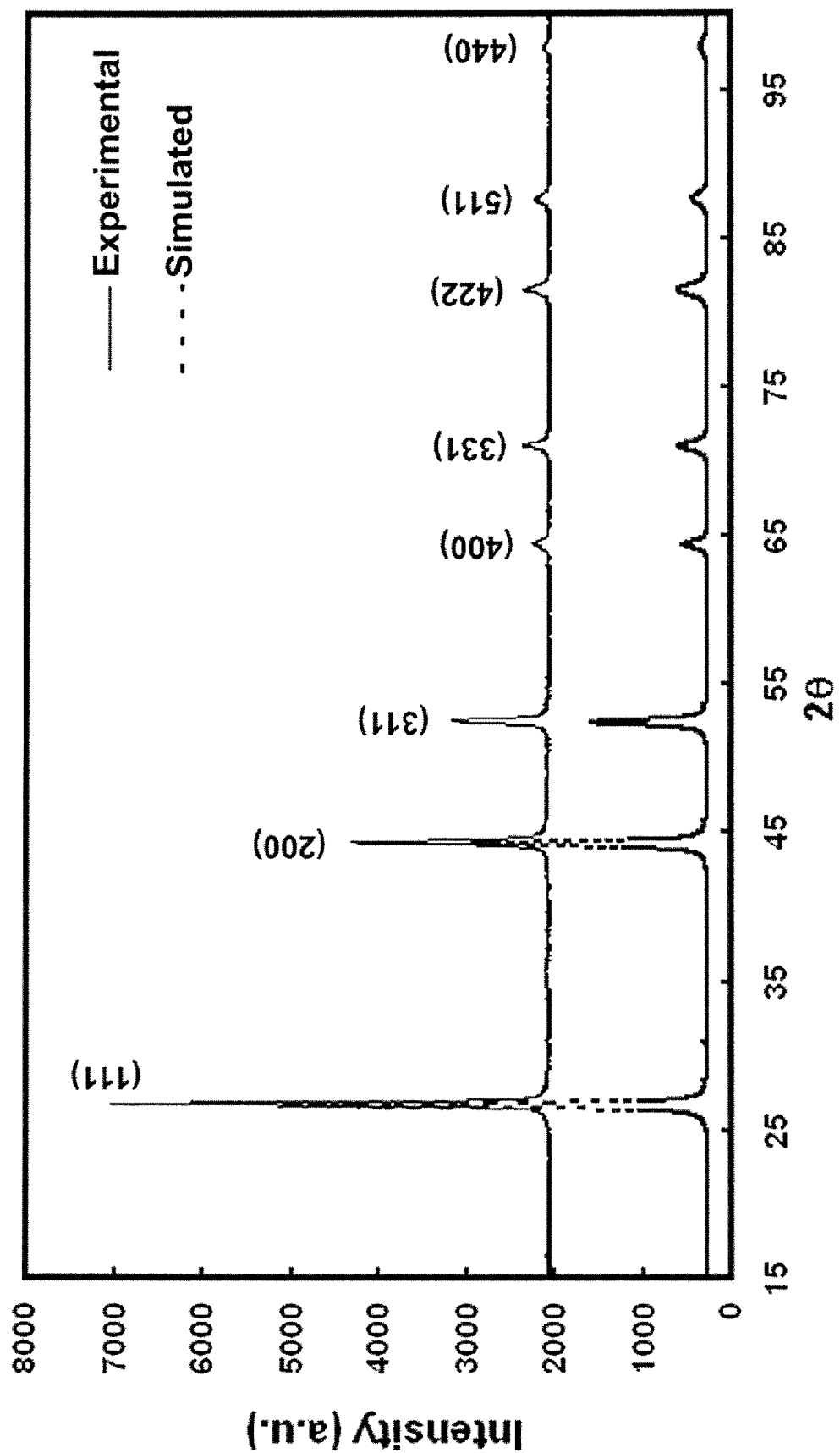
FIG. 4 depicts a PXRD pattern of sphalerite $CuInSe_2$ nanoparticles as-synthesized in oleylamine.

A typical X-ray diffraction pattern of the as-prepared sphalerite $CuInSe_2$ nanoparticles synthesized in oleylamine is shown in FIG. 4. The major diffraction peaks observed at 26.67, 43.24, 52.42, 65.38, 70.92, 81.42, 87.58, and 97.72 degrees (2θ) can be indexed to the (111), (200), (311), (400), (331), (422), (511), and (440) planes of the $CuInSe_2$ sphalerite crystal structure, respectively. A simulated diffraction pattern of the sphalerite structure is also shown in FIG. 4 as dashed lines. The simulated pattern agrees very well with the experientially observed diffraction pattern. Furthermore, the unit cell size calculated from the diffraction data corresponds to a=5.786 and c=11.571, and the corresponding c/2a ratio of 1.000, which does not show any tetragonal distortion, is an indication of the sphalerite phase. The crystalline size calculated using the Scherrer equation corresponds to approximately 35 nm.

The morphology of the sphalerite $CuInSe_2$ nanoparticles was then examined using FE-SEM. FE-SEM was performed with the samples prepared by dropping a dilute solution of the nanoparticles in the non-polar solvent hexane on a molybdenum foil conducting substrate and left to dry in air or under vacuum.

Figure 5:
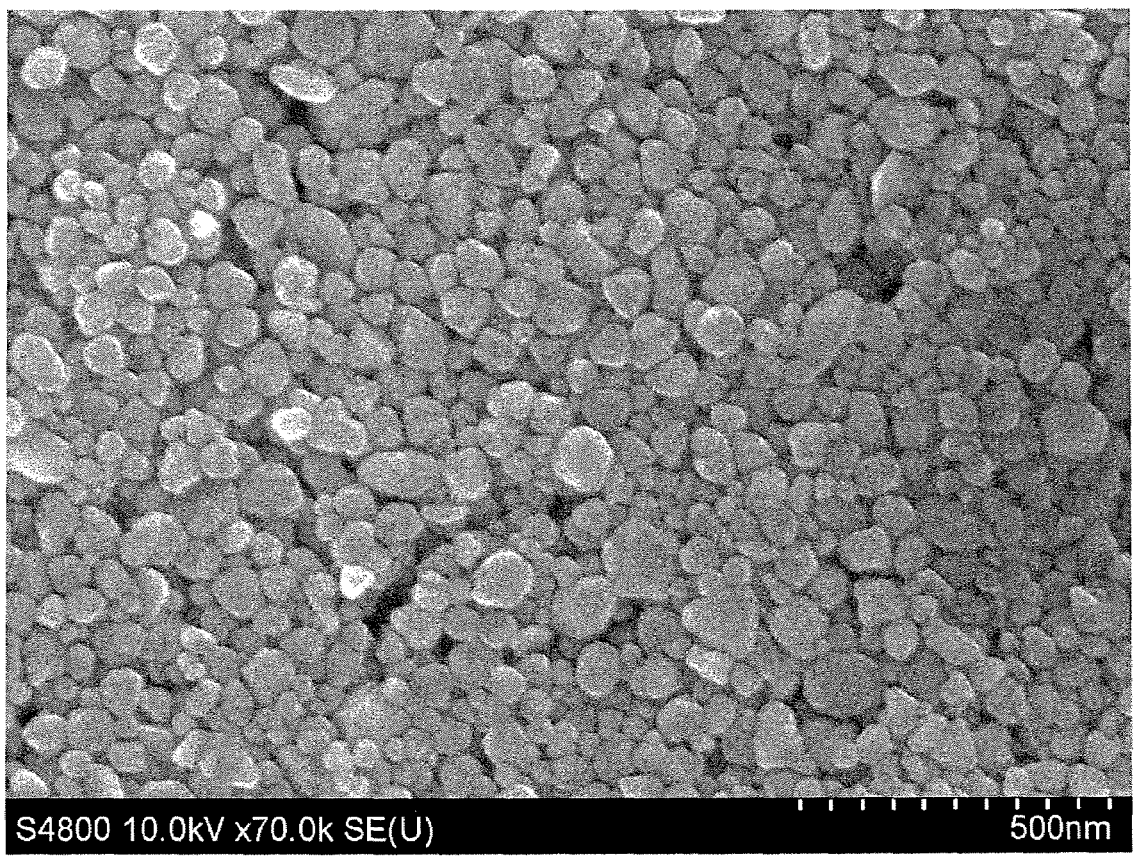
FIG. 5 depicts an FE-SEM image of sphalerite $CuInSe_2$ nanoparticles as-synthesized in oleylamine.

FIG. 5 shows a typical FE-SEM image of the nanoparticles synthesized in oleylamine. The nanoparticles appeared to be isotropic in shapes and had an average size of about 40 nm, which corresponds to the crystalline size calculated from the PXRD data.

Figure 6:
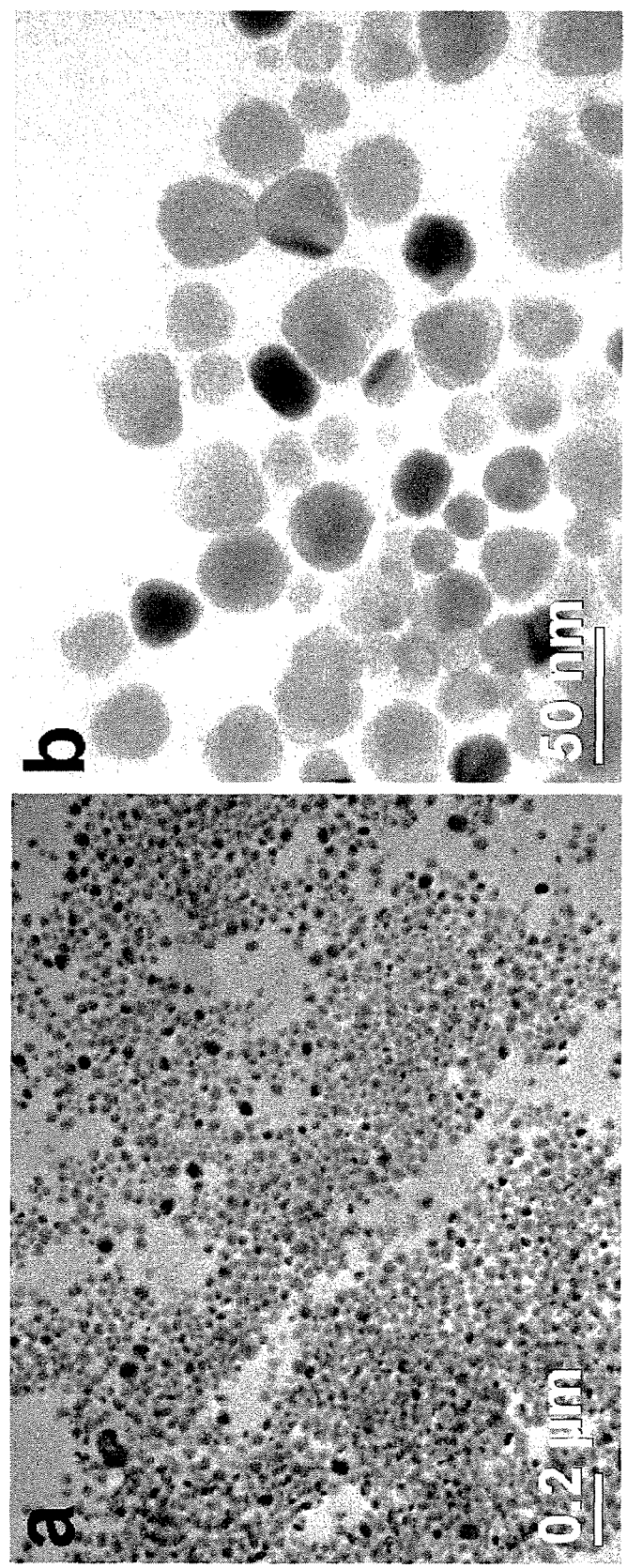
FIGS. 6a and b depict TEM images of sphalerite $CuInSe_2$ nanoparticles prepared in oleylamine.

Further characterization of the nanoparticles using TEM was performed with the samples prepared by drop casting a dilute solution of the nanoparticles in non-polar solvent on a carbon film coated TEM grid. FIG. 6a depicts a large area micrograph of the as-synthesized $CuInSe_2$ nanoparticles with the inset showing the corresponding selected area electron diffraction pattern. The nanoparticles appear to be slightly polydispersed in both size and morphology, which corresponds well with the observations from the FE-SEM image. FIG. 6b shows a higher magnification image of the same nanoparticles and clearly illustrates that the nanoparticles are individually separated from each other with no signs of agglomeration. Composition analysis using ICPMS for the $CuInSe_2$ nanorings synthesized in oleylamine showed an overall Cu:In:Se ratio of 1.00:1.021:1.945 which is very close to a stoichiometric ratio. Further analysis using EDX shows a Cu/In ratio of approximately 1, which is consistent with the results from ICPMS.

Example 2

Chalcopyrite $CuInSe_2$ nanoparticles were synthesized using oleylamine as the only solvent. It is believed that the amines may act as surfactants or stabilizers during the synthesis of the nanoparticles even though the present invention is not bound by this conjecture. 3 ml of oleylamine was added to a 25 ml three-neck round bottom flask connected to a Schlenk line apparatus as shown in FIG. 3. The contents in the flask were then heated to 130° C. and purged with argon three times by repeated cycles of vacuuming and back-filling with inert gas, and then degassed at 130° C. for 30 minutes. Next, 2.5 ml of 0.2 M CuCl in oleylamine, 2.5 ml of 0.2 molar $InCl_3$ in oleylamine, and 4 ml of 0.25 molar Se powder in oleylamine were added to the reaction flask. After adding the precursors and purging the mixture with inert gas for a couple times, the temperature of the mixture was slowly raised up to 265° C., which took about 1 hour to achieve. The reaction was then held at 265° C. for 1 hour to complete the process. After the reaction, the mixture was then allowed to cool to 60° C. and the non-polar solvent hexane was added to disperse the particles. The miscible anti-solvent ethanol was then added to flocculate the particles. The particles were then collected by centrifuging at 10000 RPM for 10 minutes. The dark precipitate was then redispersed in a non-polar solvent to form a stable dispersion.

Figure 7:
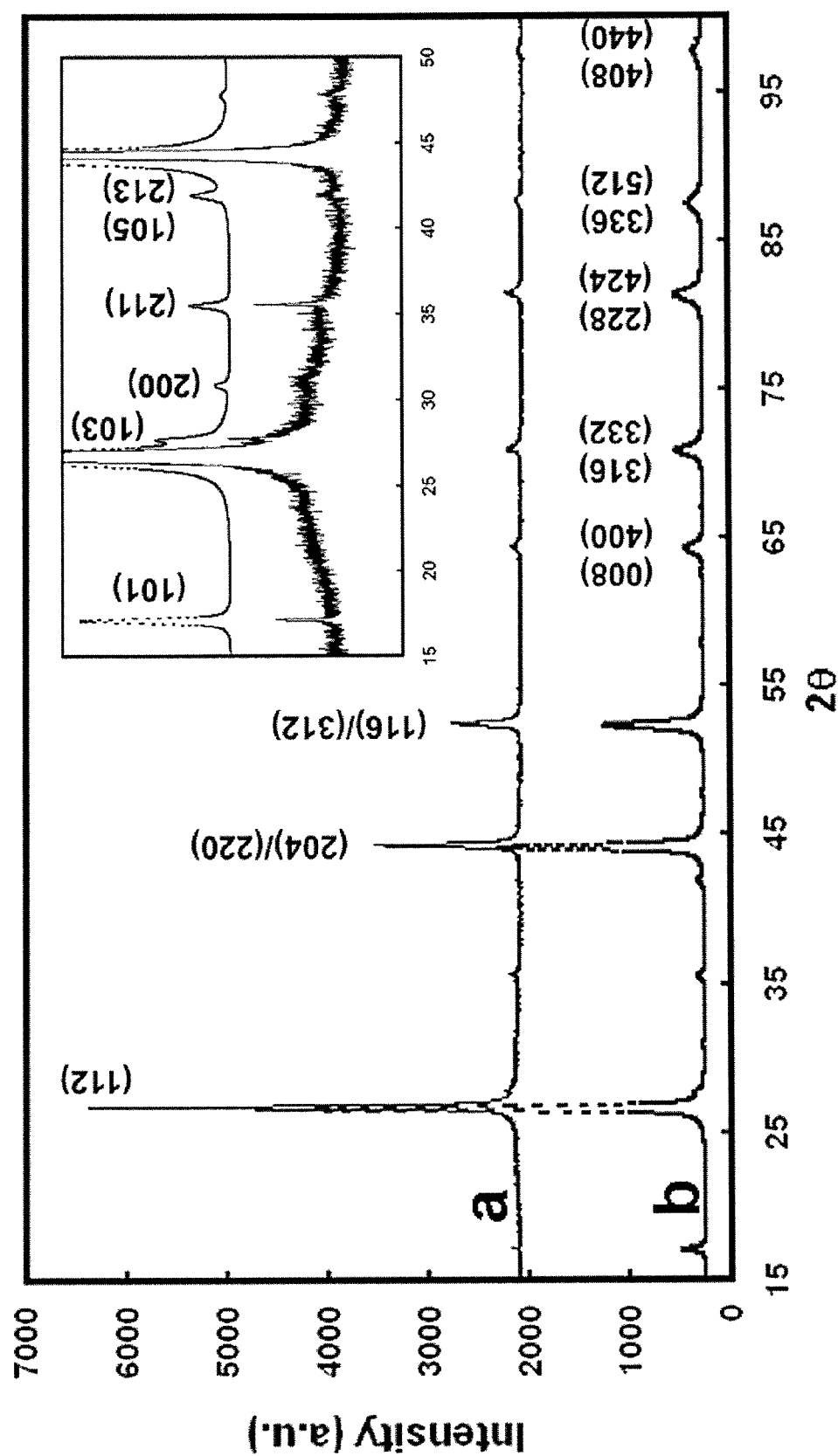
FIG. 7 depicts a PXRD pattern of chalcopyrite $CuInSe_2$ nanoparticles as-synthesized in oleylamine.

FIG. 7 depicts a typical powder PXRD pattern of the as-synthesized chalcopyrite CIS nanocrystals. The diffraction pattern agrees very well with the reference JCPD data (PDF card # 40-1487) for chalcopyrite $CuInSe_2$. The crystalline size of the nanocrystals calculated using Scherrer's equation based on the (112) peak is 45 nm. The major diffraction peaks observed at 26.653, 44.216, 52.394, 64.357, 70.896, 81.381, 87.524, and 97.630 degree (2θ) can be indexed to the (112), (204)/(220), (116)/(312), (008)/(400), (316)/(332), (228)/(424), (336)/(512), and (408)/(440) of the tetragonal chalcopyrite crystal structure, respectively. Furthermore, the minor peaks at 17.142°, 27.741°, and 35.551° corresponding to the (101), (103), and (211) peaks respectively are unique to the chalcopyrite structure, as shown in the inset of FIG. 7. The lattice constants calculated from the chalcopyrite diffraction data were a=5.787±0.003 Å and c=11.617±0.001 Å, with the c/2a ratio of 1.004±0.001 showing the characteristic tetragonal distortion of the chalcopyrite structure. A simulated PXRD pattern of the chalcopyrite is also shown in FIG. 7 as dashed line in trace b. The simulated X-ray diffraction pattern of the chalcopyrite structure also agrees very well with the experimental observed diffraction pattern.

Figure 8:
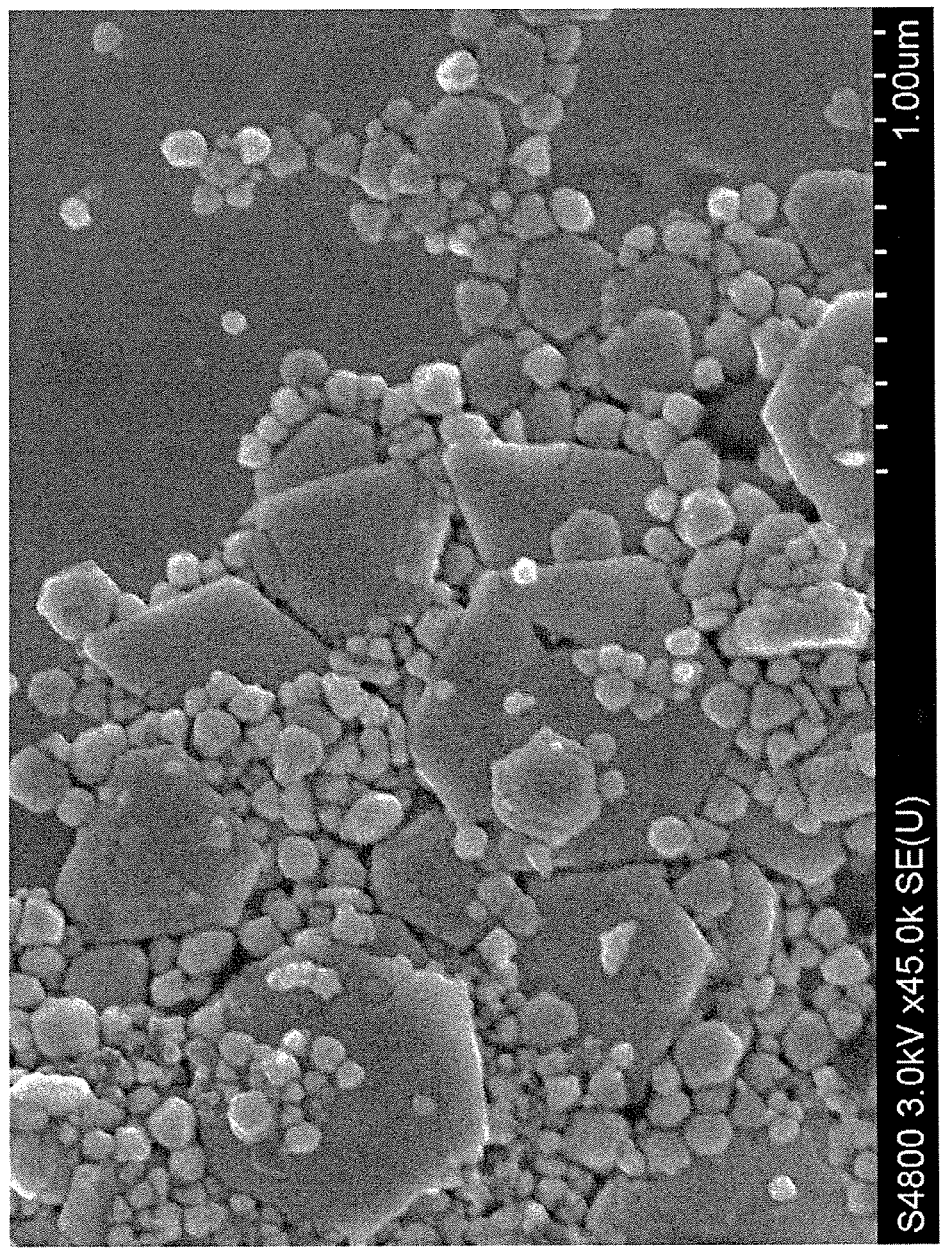
FIG. 8 depicts an FE-SEM image of chalcopyrite $CuInSe_2$ nanoparticles prepared in oleylamine.

FIG. 8 depicts the FE-SEM images of the as-synthesized chalcopyrite CIS nanocrystals respectively. The size of the chalcopyrite nanoparticles ranges from about 50 nm for the isotropic nanoparticles and hundreds of nanometers for the nanodisks. Further characterization of the chalcopyrite CIS nanoparticles using TEM was then performed.

Figure 9:
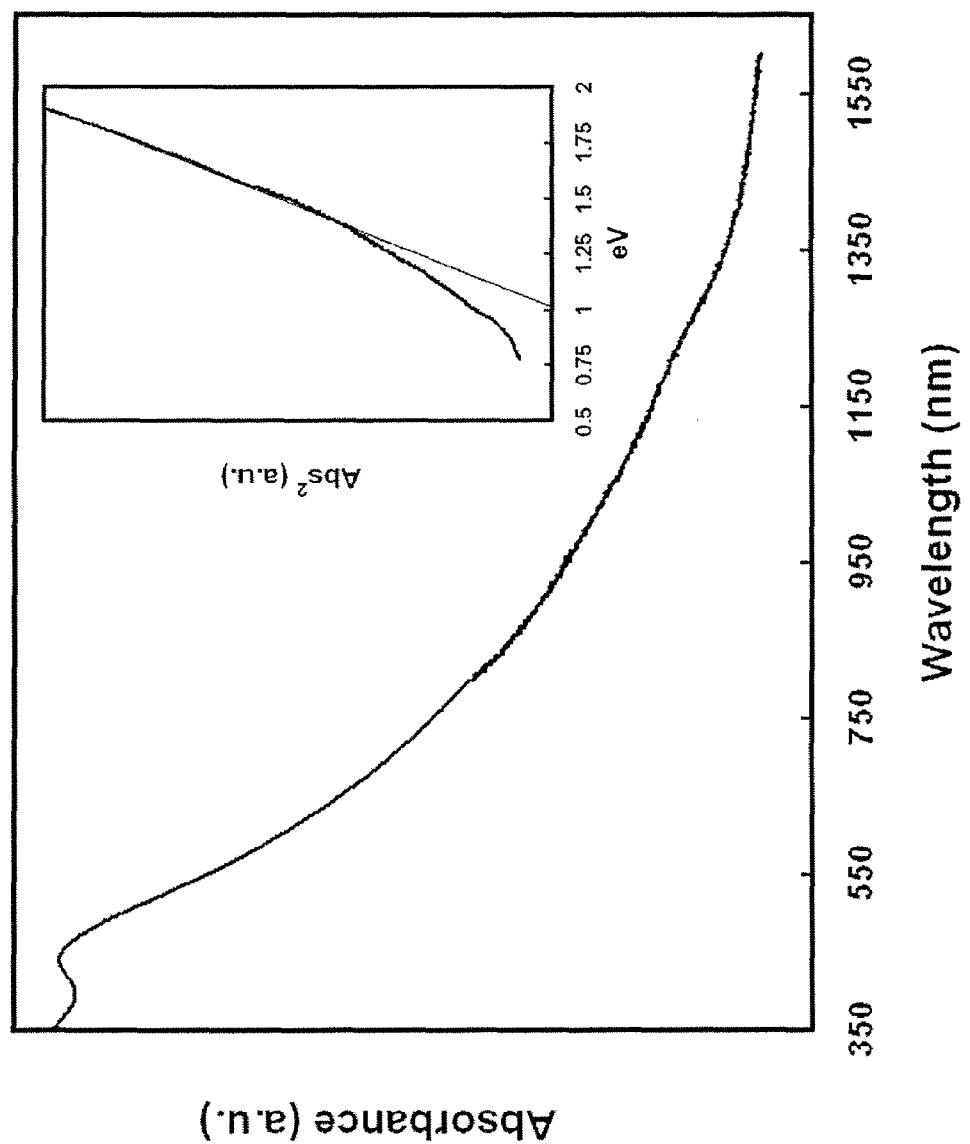
FIG. 9 depicts an UV-VIS absorption spectrum of chalcopyrite $CuInSe_2$ nanoparticles.

FIG. 9 shows the UV-VIS absorption spectrum of the chalcopyrite nanocrystals. The bandgap energy of the CIS nanocrystals was determined using the direct bandgap method by plotting absorbance squared versus energy and extrapolating to zero, inset of FIG. 9. The bandgap of the nanocrystals was determined to be 1.06±0.02 eV, which is in good agreement with the reported value of 1.04 eV for chalcopyrite $CuInSe_2$. The composition of the chalcopyrite nanoparticles was analyzed using EDX with statistical examinations of a large number of different areas of CIS nanoparticles. The average composition and standard deviations of the chalcopyrite CIS nanoparticles was determined to be $Cu_{0.99\pm0.11}In_{1.02\pm0.07}Se_2$, which is very close to stoichiometric $CuInSe_2$.

Example 3

According to this example, $CuInSe_2$ nanoparticles were synthesized into the shape of nanodisks. To achieve this, metal and chalcogen precursor solutions were prepared by dissolving the corresponding metal halides and Se in trioctylphosphine (TOP) where all of the precursors were soluble at room temperature. Specifically, 7.25 grams of octadecylamine was added to a 25 ml three-neck round bottom flask connected to a Schlenk line. The contents in the flask were degassed for 1 hour at 130° C. under vacuum, and then purged with argon. Next, 0.1 ml of 1 molar solution of CuCl in TOP was injected into the flask and purged with argon. Then, 0.1 ml of 1 molar solution of $InCl_3$ in TOP was injected into the flask and purged again with argon. Next, the content of the flask was heated to 285° C. and 0.2 ml of 1 molar TOPSe was swiftly injected into the reaction mixture. After injection, the color of the solution started to turn dark within 30 seconds after injection, thereby indicating the formation of nanoparticles. The temperature was held at 280° C. for 30 minutes for the reaction to complete. After the reaction, the mixture was allowed to cool to 60° C. and hexane and ethanol, approximately 15 ml each, were added to precipitate the nanoparticles. The precipitate was collected by centrifuging at 10000 RPM for 10 minutes. The dark precipitate was then redispersed in a non-polar solvent to form a stable dispersion.

Figure 10:
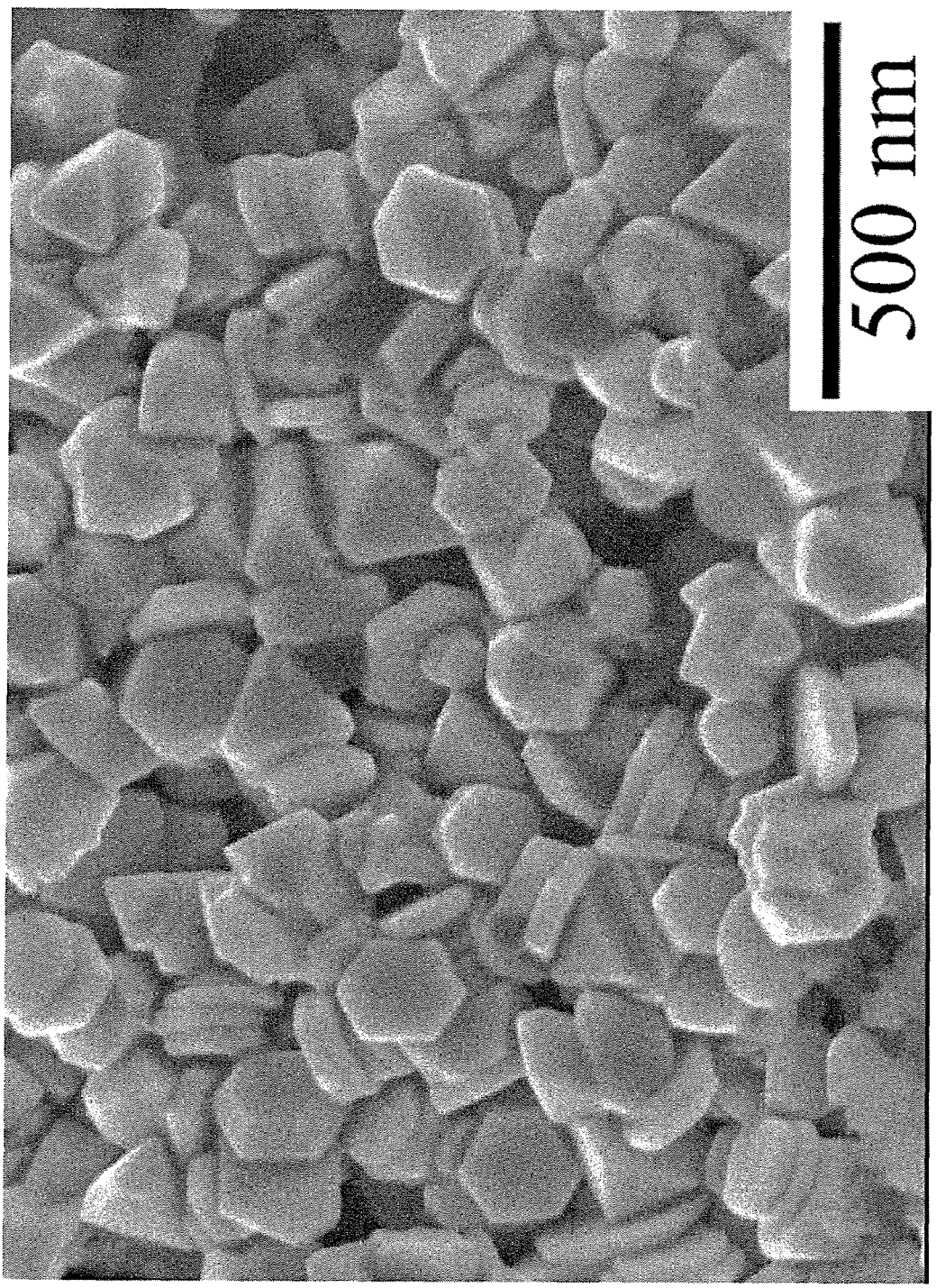
FIG. 10 depicts an FE-SEM image of large $CuInSe_2$ nanodisks prepared in octadecylamine.

The $CuInSe_2$ nanodisks were characterized using the same techniques as the $CuInSe_2$ nanoparticles as described in Example 1. FIG. 10 shows an FE-SEM image of the $CuInSe_2$ nanodisks as-synthesized in octadecylamine. The image shows that all of the particles are highly faceted with a majority having well faceted hexagonal nanodisk structures. The size of the nanodisks is in the order of 200 nm, which is significantly larger than the $CuInSe_2$ nanoparticles described in Example 1.

Figure 11:
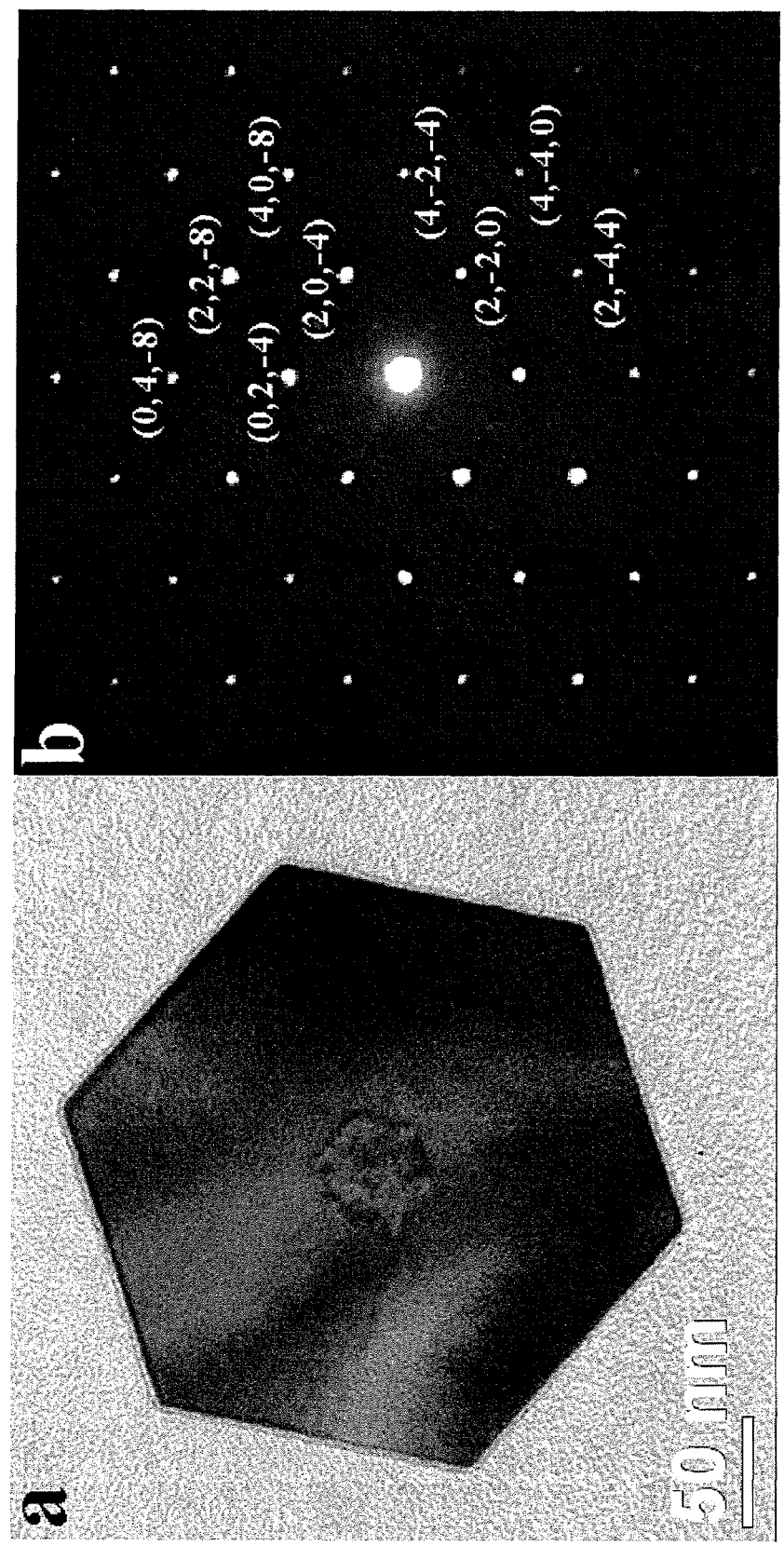
FIGS. 11a and b depict TEM images of a $CuInSe_2$ nanodisk and its corresponding electron diffraction pattern.

A TEM image of a single hexagonal $CuInSe_2$ nanodisk is shown in FIG. 11a with its corresponding selected area diffraction pattern shown in FIG. 11b. The electron diffraction shows the hexagonal array of diffraction dots of the $CuInSe_2$ crystal, which indicates the nanodisk is of a single crystalline structure.

Example 4

According to this example, $CuInSe_2$ nanoparticles were synthesized into the shape of nanorings using a procedure similar to the preparation of the $CuInSe_2$ nanodisks of Example 3, however, oleylamine was used as the solvent instead of octadecylamine. Specifically, 8.75 ml of oleylamine was added to a 25 ml three-neck round bottom flask connected to a Schlenk line. The contents in the flask were degassed for 1 hour at 130° C. under vacuum, and then purged with argon. Next, 0.1 ml of 1 molar solution of CuCl in TOP was injected into the flask and purged with argon. Then, 0.1 ml of 1 molar solution of $InCl_3$ in TOP was injected into the flask and purged again with argon. Next, the contents of the flask were heated to 285° C. and 0.2 ml of 1 molar TOPSe was swiftly injected into the reaction mixture. After injection, the color of the solution started to turn dark within 30 seconds after injection indicating the formation of nanoparticles. The temperature was held at 280° C. for 30 minutes for the reaction to complete. After the reaction, the mixture was allowed to cool to 60° C. and hexane and ethanol were added to precipitate the nanoparticles. The precipitate was collected by centrifuging at 10000 RPM for 10 minutes. The dark precipitate was then redispersed in a non-polar solvent to form a stable dispersion.

Figure 12:
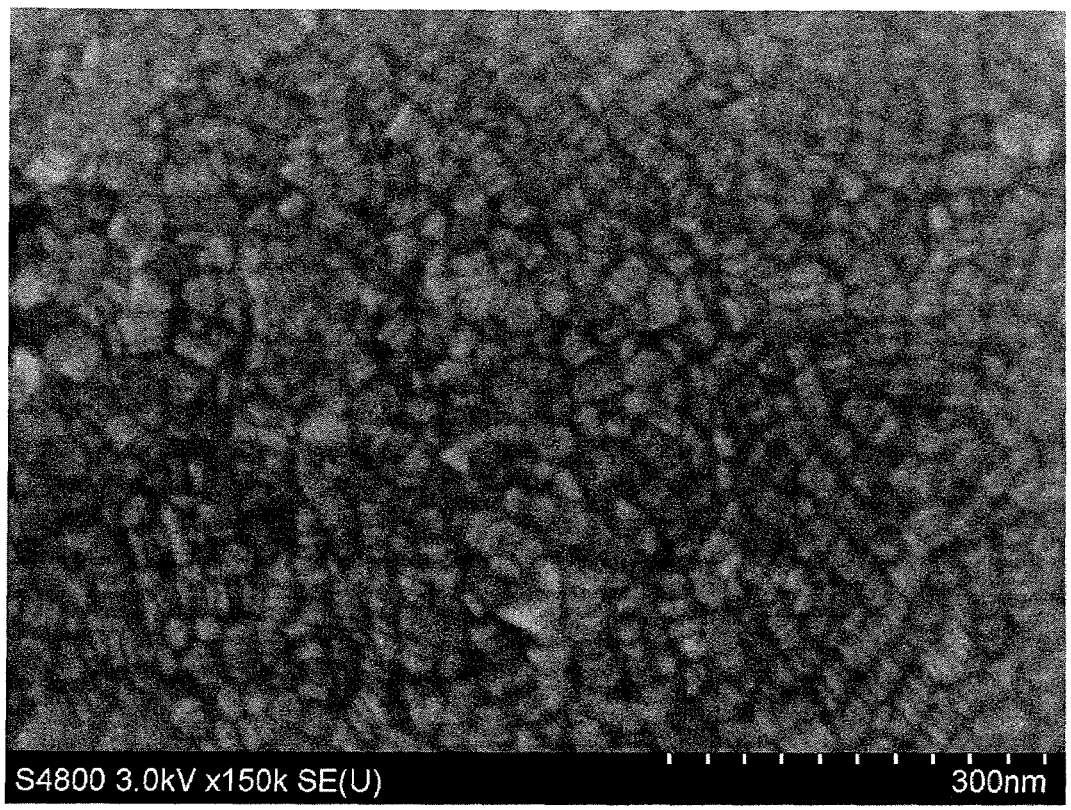
FIG. 12 depicts an FE-SEM image of $CuInSe_2$ nanorings as prepared in oleylamine.

The $CuInSe_2$ nanorings were characterized using the same techniques as described in the previous examples. FIG. 12 shows a FE-SEM image of the $CuInSe_2$ nanoparticles as-synthesized in oleylamine showing the nanoring structure. It is interesting to note that the nanorings self-assembled face-to-face on their edge into long chains, thereby showing that the nanoparticles have a 2D ring structure. The self-assembly was a result of the strong Van der Waal attraction between the faces of the nanorings.

Figure 13:
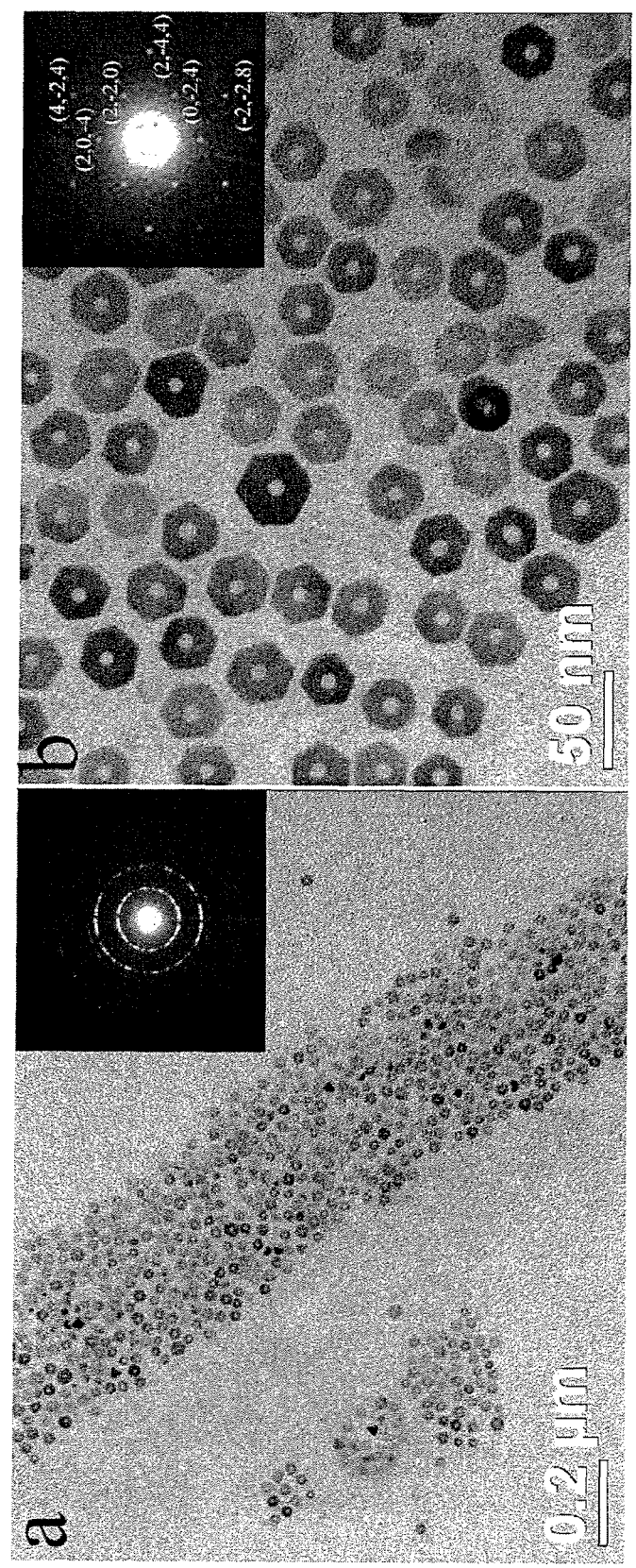
FIGS. 13a and b depict TEM images and selected area electron diffraction patterns of $CuInSe_2$ nanorings.

TEM images of the as-synthesized $CuInSe_2$ nanorings are shown in FIG. 13. FIG. 13a shows a large area TEM micrograph of the CuInSe2 nanorings as-synthesized in oleylamine. The nanorings have hexagonal facets and are relatively monodispersed in both size and shape with an average outer diameter of about 30 nm and an inner diameter of about 5 nm. Selected area electron diffraction patterns of the nanorings are shown in the inset of FIG. 13a, thereby indicating that the nanorings are crystalline. A high magnification TEM micrograph of the $CuInSe_2$ nanorings is shown in FIG. 13b, which further illustrates the unique $CuInSe_2$ nanorings. Electron diffraction for a single nanoring is shown in the inset of FIG. 13b. The hexagonal arrays of diffraction dots are similar to the diffraction pattern observed for the nanodisks, thereby indicating that the nanorings are of single crystalline structure.

Example 5

According to this example, $CuGaSe_2$ nanoparticles were synthesized using a procedure similar to the synthesis of the $CuInSe_2$ nanoparticles of Example 1, however, $GaCl_3$ was used instead of $InCl_3$. According to this example, 15 ml of oleylamine, 2.5 ml of 0.2 molar solution of CuCl in oleylamine, and 2.5 ml of 0.2 molar solution of $GaCl_3$ in oleylamine were added to a 100 ml three-neck round bottom flask connected to a Schlenk line. During the preparation of the CuCl and $GaCl_3$ precursor solutions, the temperature may be increased to about 100° C. to enhance the solubility of the CuCl and $GaCl_3$. The contents in the flask were heated to 130° C., purged with argon three times, and then degassed at 130° C. for 30 minutes. Next, the temperature of the reaction mixture was raised to 285° C., and 1 ml of 1 molar Se powder in oleylamine was rapidly injected into the reaction mixture. After injection, the temperature dropped to about 280° C. and the color of the solution started to turn dark immediately indicating the formation of nanoparticles. The temperature was held at 280° C. for 30 minutes for the reaction to complete. After the reaction, the mixture was allowed to cool to 60° C. and hexane and ethanol were added to precipitate the nanoparticles. The precipitate was collected by centrifuging at 10000 RPM for 10 minutes. The dark precipitate was then redispersed in a non-polar solvent to form a stable dispersion.

Figure 14:
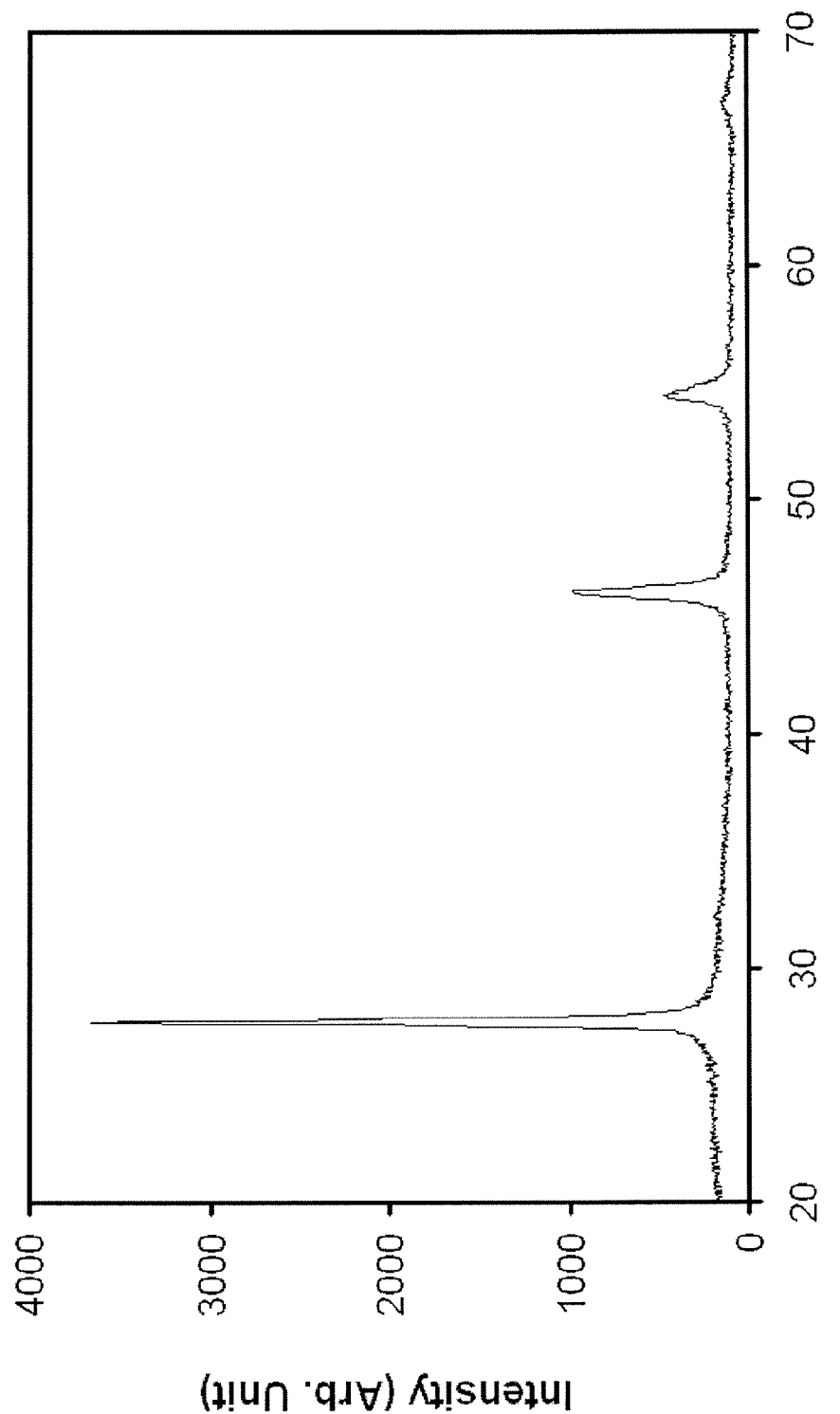
FIG. 14 depicts a PXRD pattern of $CuGaSe_2$ nanoparticles as-synthesized in oleylamine.

FIG. 14 shows a typical X-ray diffraction pattern of the as-prepared $CuGaSe_2$ nanoparticles as-synthesized in oleylamine. The major diffraction peaks observed at 27.706, 46.302, 54.454, and 66.906 degree (2θ) can be indexed to the (112), (204)/(220), (116)/(312), and (008)/(400) planes of the CuGaSe$_2$ crystal structure respectively, indicating the CGS nanocrystals are also crystalline. The crystalline size calculated using the Scherrer equation corresponds to approximately 33 nm. The diffraction pattern does not show any impurity or by-product peaks, thereby indicating that pure CuGaSe$_2$ was formed. The composition of the nanoparticles was analyzed using EDX where the ratio of Cu/Ga was approximately 0.9.

Example 6

According to this example, Cu(InGa)Se$_2$ nanoparticles were synthesized using a procedure similar to that used to synthesize the CuInSe$_2$ nanoparticles in Example 1, however, the desired amount of GaCl$_3$ and InCl$_3$ was such that the total ratio of Cu/(In+Ga) was approximately 1. Specifically, 15 ml of oleylamine, 2.5 ml of 0.2 molar solution of CuCl in oleylamine, and 2 ml of 0.2 molar solution of InCl$_3$ in oleylamine, and 0.5 ml of 0.2 molar GaCl$_3$ in oleylamine were added to a 100 ml three-neck round bottom flask connected to a Schlenk line. The contents in the flask were heated to 130° C., purged with argon three times, and then degassed at 130° C. for 30 minutes. Next, the temperature of the reaction mixture was raised to 285° C., and 1 ml of 1 molar Se powder in oleylamine was rapidly injected into the reaction mixture. After injection, the temperature dropped to about 280° C. and the color of the solution started to turn dark immediately. The temperature was held at 280° C. for 30 minutes for the reaction to complete. After the reaction, the mixture was allowed to cool to 60° C. and hexane and ethanol were added to precipitate the nanoparticles. The precipitate was then collected by centrifuging at 10000 RPM for 10 minutes.

Figure 15:
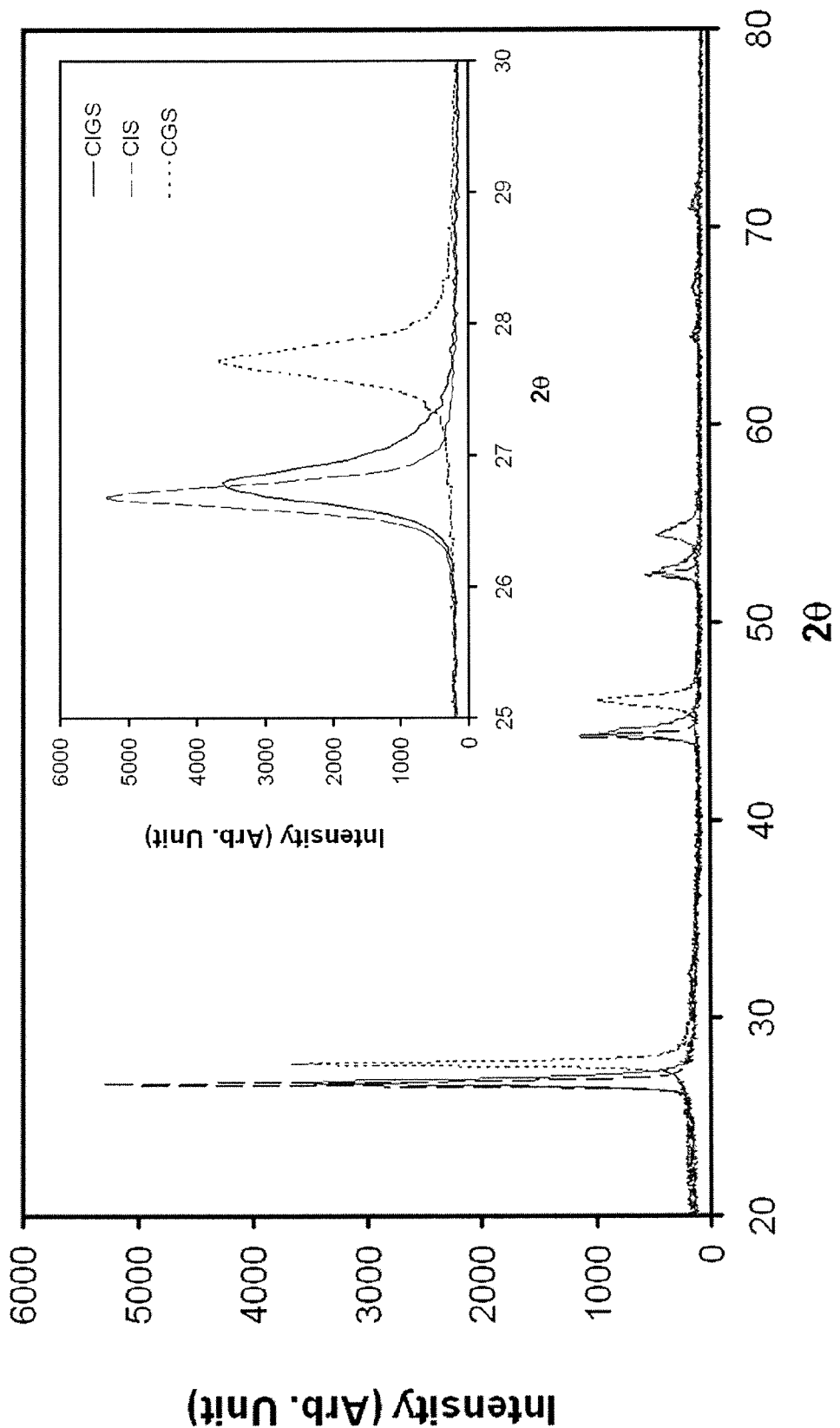
FIG. 15 depicts a PXRD pattern of $Cu(In_{1-x}Ga_x)Se_2$ nanoparticles as-synthesized in oleylamine.

FIG. 15 depicts the X-ray diffraction patterns of CuInSe$_2$, Cu(InGa)Se$_2$, and CuGaSe$_2$ nanoparticles as-synthesized in oleylamine. The diffraction peaks of the Cu(InGa)Se2 nanoparticles resembles that of the pattern shown in FIG. 4, and particularly wherein the peak positions are shifted slightly to the right. The inset shows the enlarged view of the (112) peak of the respective nanoparticles and clearly indicates the right shift of the peak due to the incorporation of gallium in the crystal structure. Since gallium's atomic size is smaller than that of indium, the diffraction peaks are expected to shift to the right as observed in experimental data. The composition of the CIGS nanoparticles was analyzed using EDX where the overall ratio of Ga/(Ga+In) was approximately 0.11 and the ratio of Cu/(Ga+In) was approximately 0.9.

Example 7

According to this example, CdSe nanoparticles were synthesized using a procedure similar to that used to synthesize the CuInSe$_2$ nanoparticles in Example 1, however, CdCl$_2$ was used as the only source of metal precursor. Specifically, 5.5 ml of oleylamine, 2.5 ml of 0.2 molar solution of CdCl$_2$ in oleylamine were added to a 25 ml three-neck round bottom flask connected to a Schlenk line. The contents in the flask were heated to 130° C., purged with argon three times, and then degassed at 130° C. for 30 minutes. Next, the temperature of the reaction mixture was raised to 315° C., and 4 ml of 0.25 molar Se powder in oleylamine was rapidly injected into the reaction mixture. After injection, the temperature dropped to about 275° C. and. The temperature was held at 275° C. for 30 minutes for the reaction to complete. After the reaction, the mixture was allowed to cool to 60° C. and hexane and ethanol were added to precipitate the nanoparticles. The precipitate was then collected by centrifuging at 10000 RPM for 10 minutes.

Figure 16:
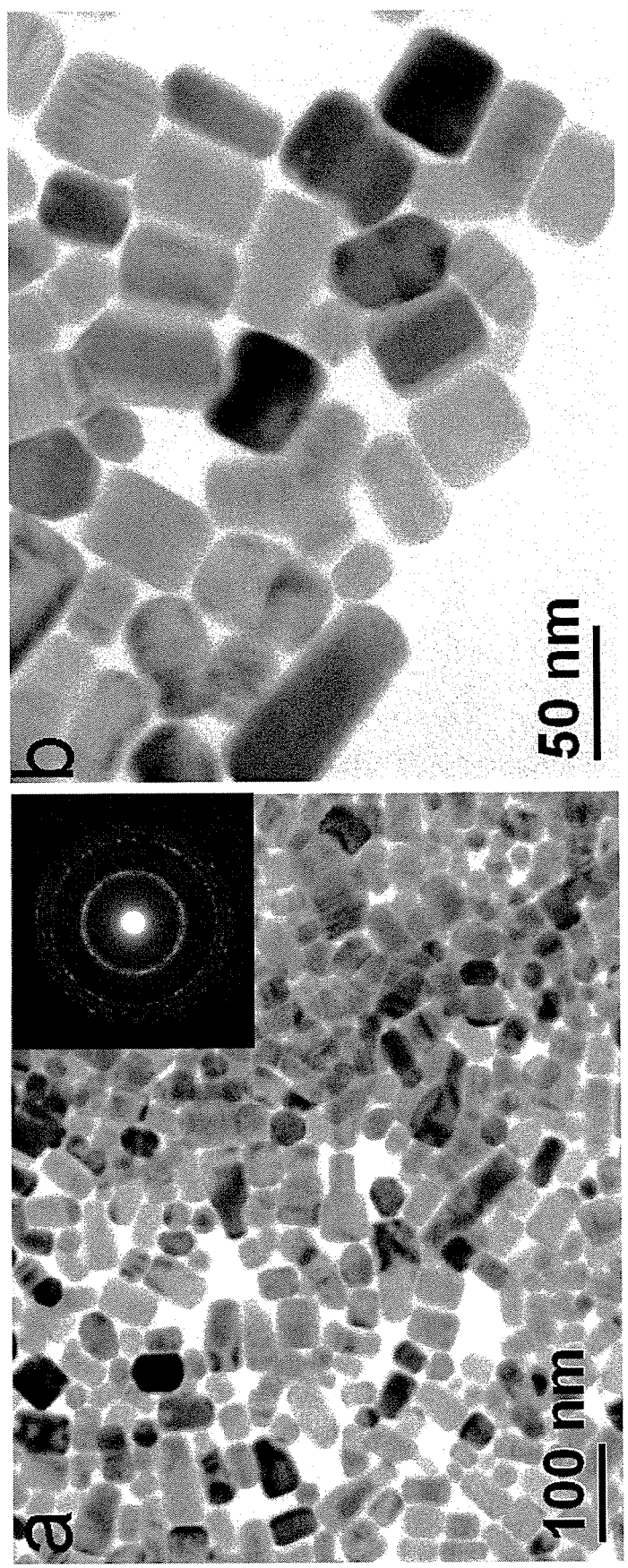
FIGS. 16a and b depict TEM images and electron diffraction patterns of CdSe nanoparticles as-synthesized in oleylamine.

TEM analysis of the as-synthesized CdSe nanoparticles is shown in FIG. 16. FIG. 16a shows a large area TEM micrograph of the CdSe nanoparticles as-synthesized in oleylamine. The CdSe nanoparticles are highly faceted and rectangular. Selected area electron diffraction patterns of the nanoparticles are shown in the inset of FIG. 16a, thereby indicating that the CdSe nanoparticles are crystalline. Higher magnification of the CdSe nanoparticles is shown in FIG. 16b to further illustrate their unique shape and highly faceted nature.

The above examples show that chalcogenide nanoparticles in various shapes and sizes can be synthesized in accordance with the presently disclosed teachings. The exemplary examples provided herein depict a number of illustrative shapes and sizes for the nanoparticles, and it is to be understood that the current process may be utilized to synthesize nanoparticles of other shapes and sizes without straying from the scope of the present teachings. Moreover, the stoichiometry and composition of the chalcogenide nanoparticles can also be varied as well. While the precursor solutions used to synthesize the various chalcogenide nanoparticles within the illustrative examples were represented in stoichiometric amounts, it should be understood that this should not be interpreted as limiting the scope of the present invention. Rather, those skilled in the art will readily recognize that various other amounts of metal and chalcogen precursors can be used herein and at different ratios without straying from the presently disclosed teachings. For example, excess chalcogen precursors could be added to drop the reaction temperature to separate the nucleation and growth stages and to focus the size distribution of the nanoparticles. In addition, through examples the present inventors have shown that in addition to various chalcogenide nanoparticles of selenium, analogous particles of other chalcogens (e.g., sulfur and tellurium) could also be prepared in accordance with the presently disclosed teachings. As such, the present invention is not intended to be limited herein.

While an exemplary embodiment incorporating the principles of the present invention has been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

REFERENCES

The following are incorporated herein by reference in their entirety:
1. Ramanathan K, Contreras M A, Perkins C L, Asher S, Hasoon F S, et al. 2003. *Progress in Photovoltaics* 11: 225-30
2. Schulz D L, Curtis C J, Flitton R A, Wiesner H, Keane J, et al. 1998. *Journal of Electronic Materials* 27: 433-7
3. Eberspacher C, Fredric C, Pauls K, Serra J. 2001. *Thin Solid Films* 387: 18-22
4. Adurodija F O S J, Kim S D, Kwon S H, Kim S K, Yoon K H, Ahn B T. 1999.
5. Hermann A M, Mansour M, Badri V, Pinkhasov B, Gonzales C, et al. 2000. *Thin Solid Films* 361: 74-8
6. Kaelin M, Rudmann D, Kurdesau F, Meyer T, Zogg H, Tiwari A N. 2003. *Thin Solid Films* 431: 58-62
7. Kapur V K, Basol B M, Leidholm C R, Roe R. 2000. U.S. Pat. No. 6,127,202

8. Bhattacharya R N, Batchelor W, Ramanathan K, Contreras M A, Moriarty T. 2000. *Solar Energy Materials and Solar Cells* 63: 367-74

9. Jones P A, Jackson A D, Lickiss P D, Pilkington R D, Tomlinson R D. 1994. *Thin Solid Films* 238: 4-7

10. Duchemin S, Artaud M C, Ouchen F, Bougnot J, Pougnet A M. 1996. *Journal of Materials Science-Materials in Electronics* 7: 201-5

11. Artaud M C, Ouchen F, Martin L, Duchemin S. 1998. *Thin Solid Films* 324: 115-23

12. Kaelin M, Zogg H, Tiwari A, Wilhelm O, Pratsinis S E, et al. 2004. *Thin Solid Films* 457: 391-6

13. Schulz D L, Curtis C J, Flitton R A, Ginley D S. 1998. In *Surface-Controlled Nanoscale Materials for High-Added-Value Applications*, pp. 375-80

14. Gur I, Fromer N A, Geier M L, Alivisatos A P. 2005. *Science* 310: 462-5

15. Schulz D L, Curtis C J, Ginley D S. 2000. U.S. Pat. No. 6,126,740

16. Carmalt C, Morrision D, Parkin I. 1998. *Journal of Materials Chemistry* 8: 2209-11.

17. Murray C B, Kagan C R, Bawendi M G. 2000. *Annual Review of Materials Science* 30: 545-610

18. Malik M A, O'Brien P, Revaprasadu N. 1999. *Advanced Materials* 11: 1441-4

19. Castro S L, Bailey S G, Raffaelle R P, Banger K K, Hepp A F. 2003. *Chemistry of Materials* 15: 3142-7

20. Grisaru H, Palchik O, Gedanken A, Palchik V, Slifkin M A, Weiss A M. 2003. *Inorganic Chemistry* 42: 7148-55

21. Li B, Xie Y, Huang J X, Qian Y T. 1999. *Advanced Materials* 11: 1456-9

22. Jiang Y, Wu Y, Mo X, Yu W C, Xie Y, Qian Y T. 2000. *Inorganic Chemistry* 39: 2964-+

23. Chun Y G, Kim K H, Yoon K H. 2005. *Thin Solid Films* 480: 46-9

What is claimed is:

1. A method for synthesizing a chalcogenide nanoparticle, comprising:
reacting a metal component with a chalcogen precursor in the presence of an organic solvent having at least one of a boiling temperature equal to 220° C. or above and a chain length of about 12 carbon atoms or above, wherein the chalcogenide nanoparticle comprises at least one of a ternary or a multinary, chalcogenide nanoparticle.

2. The method of claim 1, wherein the organic solvent comprises an alkyla mine solvent.

3. The method of claim 2, wherein the alkylamine solvent is selected from the group consisting of dodecylamines, tetradecylamines, hexadecylamines, octadecylamines, oleylamines and trioctylamines.

4. The method of claim 1, wherein the metal component comprises at least one of metal halides and elemental metal precursors.

5. The method of claim 1, wherein the chalcogen precursor comprises at least one of an elemental chalcogen and a chalcogen compound.

6. The method of claim 5, wherein the elemental chalcogen is selected from at least one of selenium, tellurium and sulfur.

7. The method of claim 1, further comprising preparing a metal and chalcogenide precursor solution in the presence of at least one of an alkylamine solvent and an alkylphosphine solvent, the precursor solution being prepared at a temperature from about 20° C. to about 220° C. and near atmospheric pressure.

8. The method of claim 1, wherein the at least one of a ternary or a multinary chalcogenide nanoparticle are each independently being formed of a combination of components selected from the group consisting of Cu, In, Ga and Se.

9. The method of claim 8, wherein the ternary chalcogenide nanoparticle is selected from at least one of $CuInSe_2$ and $CuGaSe_2$.

10. The method of claim 8, wherein the multinary chalcogenide nanoparticle comprises $Cu(In_1Ga_{1-x})Se_2$, wherein x is equal to a number between 0 and 1.

11. The method of claim 1, wherein the chalcogenide nanoparticle has an average particle size of from about 5 nm to about 1000 nm.

12. The method of claim 1, wherein the chalcogenide nanoparticle comprises a nanodisk having an average diameter of from about 5 nm to about 1000 nm.

13. The method of claim 1, wherein the chalcogenide nanoparticle comprises a chalcogenide nanoring having an average outer diameter of from about 5 nm to about 1000 nm.

14. The method of claim 1, further comprising degassing and purging the organic solvent with an inert gas at a temperature equal to about 110° C. or above, the inert gas being selected from at least one of $N_2$, Ar and He.

15. The method of claim 1, further comprising controlling the shape of the chalcogenide nanoparticle by varying the organic solvent used during the step of reacting the metal component with the chalcogen precursor.

16. The method of claim 15, wherein the chalcogenide nanoparticle is a near-isotropic chalcogenide nanoparticle and is formed by dissolving the metal component and the chalcogen precursor in alkylamine at a temperature of about 220° or above.

17. The method of claim 15, wherein the chalcogenide nanoparticle is a disk-shaped chalcogenide nanoparticle and is formed by dissolving the metal component and the chalcogen precursor in trioctylphosphine and octadecylamine at a temperature of about 220° or above.

18. The method of claim 15, wherein the chalcogenide nanoparticle is a ring-shaped chalcogenide nanoparticle and is formed by dissolving the metal component and the chalcogen precursor in trioctylphosphine and oleylamine at a temperature of about 220° or above.

19. A method for synthesizing a crystalline metal chalcogenide nanoparticle, comprising:
preparing a reaction mixture by combining a metal precursor solution with a chalcogen precursor solution in the presence of an organic solvent, the organic solvent having at least one of a boiling temperature equal to about 220° C. or above and a chain length of about 12 carbon atoms or above;
separating nanoparticles from the reaction mixture by adding at least one of a solvent and an anti-solvent to the mixture;
collecting a solid precipitate of the nanoparticles from the mixture; and re-dispersing the collected solid precipitate in a non-polar solvent to form a stable nanoparticle suspension; and
wherein the chalcogenide nanoparticle comprises at least one of a ternary or a multinary chalcogenide nanoparticle.

20. The method of claim 19, wherein the organic solvent comprises an alkylamine solvent.

21. The method of claim 20, wherein the alkylamine solvent is selected from the group consisting of dodecylamines, tetradecylamines, hexadecylamines, octadecylamines, oleylamines and trioctylamines.

22. The method of claim 19, wherein the metal precursor solution comprises at least one of metal halides and elemental metal precursors.

23. The method of claim 19, wherein the chalcogen precursor solution comprises at least one of an elemental chalcogen and a chalcogen compound.

24. The method of claim 23, wherein the elemental chalcogen is selected from at least one of selenium, tellurium and sulfur.

25. The method of claim 19, further comprising preparing the reaction mixture in presence of at least one of an alkylphosphine solvent, the reaction mixture being prepared at a temperature of from about 20° C. to about 220° C. and near atmospheric pressure.

26. The method of claim 19, wherein the at least one of a ternary or a multinary chalcogenide nanoparticle are each independently being formed of a combination of components selected from the group consisting of Cu, In, Ga and Se.

27. The method of claim 26, wherein the ternary chalcogenide nanoparticle is selected from at least one of $CuInSe_2$ and $CuGaSe_2$.

28. The method of claim 26, wherein the multinary chalcogenide nanoparticle comprises $Cu(In_1Ga_{1-x})Se_2$, wherein x is equal to a number between 0 and 1.

29. The method of claim 19, wherein the chalcogenide nanoparticle has an average particle size of from about 5 nm to about 1000 nm.

30. The method of claim 19, wherein the chalcogenide nanoparticle comprises a nanodisk having an average diameter of from about 5 nm to about 1000 nm.

31. The method of claim 19, wherein the chalcogenide nanoparticle comprises a chalcogenide nanoring having an average outer diameter of from about 5 nm to about 1000 nm.

32. The method of claim 19, further comprising degassing and purging the organic solvent with an inert gas at a temperature equal to about 110° C. or above, the inert gas being selected from at least one of $N_2$, Ar and He.

33. The method of claim 19, wherein the solvent is selected from hexane and toluene and the anti-solvent is selected from ethanol and methanol.

34. The method of claim 19, further comprising controlling the shape of the chalcogenide nanoparticle by varying the organic solvent used during the preparation of the reaction mixture.

35. The method of claim 34, wherein the chalcogenide nanoparticle is a near-isotropic chalcogenide nanoparticle and is formed by dissolving the metal component and the chalcogen precursor in alkylamine at a temperature of about 220° or above.

36. The method of claim 34, wherein the chalcogenide nanoparticle is a disk-shaped chalcogenide nanoparticle and is formed by dissolving the metal component and the chalcogen precursor in trioctylphosphine and octadecylamine at a temperature of about 220° or above.

37. The method of claim 34, wherein the chalcogenide nanoparticle is a ring-shaped chalcogenide nanoparticle and is formed by dissolving the metal component and the chalcogen precursor in trioctylphosphine and oleylamine at a temperature of about 220° or above.

38. A method for synthesizing a crystalline metal chalcogenide nanoparticle, comprising:
reacting a metal component with a chalcogen precursor in the presence of an alkylamine solvent selected from the group consisting of dodecylamines, tetradecylamines, hexadecylamines, octadecylamines, oleylamines and trioctylamines;
wherein the chalcogenide nanoparticle comprises at least one of a ternary or a multinary chalcogenide nanoparticle, the ternary or multinary chalcogenide nanoparticles each being formed of a combination of components selected from the group consisting of Cu, In, Ga and Se.

39. The method of claim 38, further comprising preparing a metal and chalcogenide precursor solution in the presence of at least one of an alkylamine solvent and an alkylphosphine solvent and at a temperature from about 20° C. to about 220° C. and near atmospheric pressure.

40. The method of claim 38, wherein the metal component comprises at least one of metal halides and elemental metal precursors.

41. The method of claim 38, wherein the chalcogen precursor comprises at least one of an elemental chalcogen and a chalcogen compound.

42. The method of claim 1, wherein the elemental chalcogen is selected from at least one of selenium, tellurium and sulfur.

43. The method of claim 38, wherein the ternary chalcogenide nanoparticle is selected from at least one of $CuInSe_2$ and $CuGaSe_2$.

44. The method of claim 38, wherein the multinary chalcogenide nanoparticle comprises $Cu(In_1Ga_{1-x})Se_2$, wherein x is equal to a number between 0 and 1.

45. The method of claim 38, wherein the chalcogenide nanoparticle has an average particle size of from about 5 nm to about 1000 nm.

46. The method of claim 38, wherein the chalcogenide nanoparticle comprises a nanodisk having an average diameter of from about 5 nm to about 1000 nm.

47. The method of claim 38, wherein the chalcogenide nanoparticle comprises a chalcogenide nanoring having an average outer diameter of from about 5 nm to about 1000 nm.

48. The method of claim 38, further comprising degassing and purging the alkylamine solvent with an inert gas at a temperature equal to about 110° C. or above, the inert gas being selected from at least one of $N_2$, Ar and He.

49. The method of claim 38, wherein the chalcogenide nanoparticles further comprise elemental constituents that are substitutable with at least one elemental metal selected from Ag, Zn and Cd.

50. The method of claim 38, further comprising controlling the shape of the chalcogenide nanoparticle by varying the organic solvent used during the step of reacting the metal component with the chalcogen precursor.

51. The method of claim 50, wherein the chalcogenide nanoparticle is a near-isotropic chalcogenide nanoparticle and is formed by dissolving the metal component and the chalcogen precursor in alkylamine at a temperature of about 220° or above.

52. The method of claim 50, wherein the chalcogenide nanoparticle is a disk-shaped chalcogenide nanoparticle and is formed by dissolving the metal component and the chalcogen precursor in trioctylphosphine and octadecylamine at a temperature of about 220° or above.

53. The method of claim 50, wherein the chalcogenide nanoparticle is a ring-shaped chalcogenide nanoparticle and is formed by dissolving the metal component and the chalcogen precursor in trioctylphosphine and oleylamine at a temperature of about 220° or above.

54. A method for synthesizing a chalcogenide nanoparticle, comprising:
reacting a metal component with a chalcogen precursor in the presence of an organic solvent near atmospheric pressure and for a period of from about 5 minutes to about 60 minutes, wherein the chalcogenide nanoparticle comprises at least one of a ternary or a multinary chalcogenide nanoparticle.

55. The method of claim 54, wherein the organic solvent comprises an alkylamine solvent.

56. The method of claim 55, wherein the alkylamine solvent is selected from the group consisting of dodecylamines, tetradecylamines, hexadecylamines, octadecylamines, oleylamines and trioctylamines.

57. The method of claim 54, wherein the metal component comprises at least one of metal halides and elemental metal precursors.

58. The method of claim 54, wherein the chalcogen precursor comprises at least one of an elemental chalcogen and a chalcogen compound.

59. The method of claim 58, wherein the elemental chalcogen is selected from at least one of selenium, tellurium and sulfur.

60. The method of claim 54, further comprising preparing a metal and chalcogenide precursor solution in the presence of at least one of an alkylamine solvent and an alkylphosphine solvent, the precursor solution being prepared at a temperature from about 20° C. to about 220° C. and near atmospheric pressure.

61. The method of claim 54, wherein the at least one of a ternary or a multinary chalcogenide nanoparticle are each independently being formed of a combination of components selected from the group consisting of Cu, In, Ga and Se.

62. The method of claim 61, wherein the ternary chalcogenide nanoparticle is selected from at least one of $CuInSe_2$ and $CuGaSe_2$.

63. The method of claim 61, wherein the multinary chalcogenide nanoparticle comprises $Cu(In_xGa_{1-x})Se_2$, wherein x is equal to a number between 0 and 1.

64. The method of claim 54, wherein the chalcogenide nanoparticle has an average particle size of from about 5 nm to about 1000 nm.

65. The method of claim 54, wherein the chalcogenide nanoparticle comprises a nanodisk having an average diameter of from about 5 nm to about 1000 nm.

66. The method of claim 54, wherein the chalcogenide nanoparticle comprises a chalcogenide nanoring having an average outer diameter of from about 5 nm to about 1000 nm.

67. The method of claim 54, further comprising degassing and purging the organic solvent with an inert gas at a temperature equal to about 110° C. or above, the inert gas being selected from at least one of $N_2$, Ar and He.

68. The method of claim 54, further comprising controlling the shape of the chalcogenide nanoparticle by varying the organic solvent used during the step of reacting the metal component with the chalcogen precursor.

69. The method of claim 68, wherein the chalcogenide nanoparticle is a near-isotropic chalcogenide nanoparticle and is formed by dissolving the metal component and the chalcogen precursor in alkylamine at a temperature of about 220° or above.

70. The method of claim 68, wherein the chalcogenide nanoparticle is a disk-shaped chalcogenide nanoparticle and is formed by dissolving the metal component and the chalcogen precursor in trioctylphosphine and octadecylamine at a temperature of about 220° or above.

71. The method of claim 68, wherein the chalcogenide nanoparticle is a ring-shaped chalcogenide nanoparticle and is formed by dissolving the metal component and the chalcogen precursor in trioctylphosphine and oleylamine at a temperature of about 220° or above.

\* \* \* \* \*